(12) United States Patent
Park et al.

(10) Patent No.: US 11,841,325 B2
(45) Date of Patent: Dec. 12, 2023

(54) SUBSTRATE INCLUDING 3D NANOPLASMONIC COMPOSITE STRUCTURE, METHOD OF FABRICATING THE SAME, AND RAPID ANALYSIS METHOD USING THE SAME

(71) Applicant: KOREA INSTITUTE OF MATERIALS SCIENCE, Changwon-si (KR)

(72) Inventors: Sung-gyu Park, Changwon-si (KR); Dong-ho Kim, Changwon-si (KR); Ho-sang Jung, Changwon-si (KR); Mijeong Kang, Changwon-si (KR); Iris Baffour Ansah, Changwon-si (KR)

(73) Assignee: KOREA INSTITUTE OF MATERIALS SCIENCE, Changwon-si (KR)

( * ) Notice: Subject to any disclaimer, the term of this patent is extended or adjusted under 35 U.S.C. 154(b) by 0 days.

(21) Appl. No.: 17/242,661

(22) Filed: Apr. 28, 2021

(65) Prior Publication Data

US 2022/0034815 A1 Feb. 3, 2022

(30) Foreign Application Priority Data

Jul. 30, 2020 (KR) .................. 10-2020-0095126
Jan. 21, 2021 (KR) .................. 10-2021-0008699

(51) Int. Cl.
*G01N 21/65* (2006.01)
*G01J 3/44* (2006.01)
(Continued)

(52) U.S. Cl.
CPC .............. *G01N 21/658* (2013.01); *G01J 3/44* (2013.01); *B82Y 10/00* (2013.01); *B82Y 30/00* (2013.01); *G01N 2021/655* (2013.01)

(58) Field of Classification Search
CPC .......... G01N 21/658; G01N 2021/655; G01N 21/6486; G01N 21/554; G01N 21/6452; G01J 3/44; B82Y 30/00; B82Y 15/00
See application file for complete search history.

(56) References Cited

U.S. PATENT DOCUMENTS

| 9,593,981 B2 | 3/2017 | Weiss et al. | |
| 2014/0154668 A1* | 6/2014 | Chou ................. | G01N 21/6486 435/7.1 |

(Continued)

FOREIGN PATENT DOCUMENTS

| CN | 106770175 | 5/2017 |
| KR | 10-1639686 | 7/2016 |

(Continued)

OTHER PUBLICATIONS

Madiyar, F. R. et al. "Integration of a nanostructured dielectrophoretic device and a surface-enhanced Raman probe for highly sensitive rapid bacteria detection." Nanoscale 7.8 (2015): 3726-3736 (Year: 2015).*

(Continued)

*Primary Examiner* — Kevin Quarterman
*Assistant Examiner* — Roberto Fabian, Jr.
(74) *Attorney, Agent, or Firm* — LEX IP MEISTER, PLLC

(57) ABSTRACT

There are provided a substrate including a three-dimensional (3D) nanoplasmonic composite structure, a method of fabricating the same, and a rapid analysis method using the same. More specifically, there are provided a substrate including a 3D plasmonic-nanostructure/target-molecule composite thin film composed of an analyte and a plasmonic nanostructure and formed by applying a voltage to a plasmonic electrode in an electrochemical cell including an analyte and a metal precursor to induce an analyte molecule on the electrode and performing electrochemical deposition (Continued)

Change in shape of surface of Au nanopillar during analysis process (or electrodeposition), a method of fabricating the same, and a rapid analysis method using the same.

16 Claims, 29 Drawing Sheets

(51) Int. Cl.
*B82Y 30/00* (2011.01)
*B82Y 40/00* (2011.01)
*B82Y 10/00* (2011.01)

(56) References Cited

U.S. PATENT DOCUMENTS

| | | | |
|---|---|---|---|
| 2016/0003817 A1* | 1/2016 | Chou | G01N 21/6486 422/69 |
| 2017/0328894 A1* | 11/2017 | Zijlstra | G01N 33/5436 |
| 2018/0340204 A1* | 11/2018 | Holmes | G01N 27/327 |

FOREIGN PATENT DOCUMENTS

| | | | | |
|---|---|---|---|---|
| KR | 20200040111 | * | 4/2020 | ........... G01N 21/658 |
| WO | WO-2008068758 A1 | * | 6/2008 | ............. B82Y 15/00 |
| WO | WO-2011034533 A1 | * | 3/2011 | ........... G01N 21/658 |
| WO | WO-2011158223 A1 | * | 12/2011 | ............. G01N 21/65 |
| WO | WO-2012039764 A1 | * | 3/2012 | ............. B21D 22/00 |
| WO | WO-2016048053 A1 | * | 3/2016 | ............. A01K 61/70 |

OTHER PUBLICATIONS

Xi, W. et al.,"Elucidation of HEPES Affinity to and Structure on Gold Nanostars", Journal of the American Chemical Society 2019 141 (9), 4034-4042, DOI: 10.1021/jacs.8b13211 (Year: 2019).*
Viehrig, Marlitt, et al. "Quantitative SERS assay on a single chip enabled by electrochemically assisted regeneration: a method for detection of melamine in milk." Analytical chemistry 92.6 (2020): 4317-4325 (Year: 2020).*
Rohit Chikkaraddy et al., "Single-molecule strong coupling at room temperature in plasmonic nanocavities", Nature. Jul. 7, 2016; 535(7610): 127-130. doi:10.1038/nature17974.

* cited by examiner

Change in shape of surface of Au nanopillar during analysis process

SUBSTRATE INCLUDING 3D NANOPLASMONIC COMPOSITE STRUCTURE, METHOD OF FABRICATING THE SAME, AND RAPID ANALYSIS METHOD USING THE SAME

CROSS-REFERENCE TO RELATED APPLICATION

This application claims priority to and the benefit of Korean Patent Application No. 2020-0095126, filed on Jul. 30, 2020 and Korean Patent Application No. 2021-0008699, filed on Jan. 21, 2021, the disclosure of which is incorporated herein by reference in its entirety.

BACKGROUND

1. Field of the Invention

The present invention relates to a substrate including a three-dimensional (3D) nanoplasmonic composite structure, a method of fabricating the same, and a rapid analysis method using the same, and more particularly, to a substrate including a 3D plasmonic-nanostructure/target-molecule composite thin film composed of an analyte and a plasmonic nanostructure and formed by applying a voltage to a metal electrode in an electrochemical cell including an analyte and a metal precursor to induce an analyte molecule on the electrode and performing electrochemical deposition (or electrodeposition), a method of fabricating the same, and a rapid analysis method using the same.

2. Discussion of Related Art

The Raman signal of a molecule is amplified when the molecule interacts with the surface plasmon of a metal, termed as surface enhanced Raman spectroscopy (SERS). SERS has been employed in various biological and chemical platforms to study molecular interactions and/or quantitatively measure concentrations of the specific molecules. Two factors dominate the SERS process, i.e., the electromagnetic (EM) and chemical (CE) enhancements. The EM enhancement is induced from localized surface plasmon resonance (LSPR) generated in nanoscale metal gap and has brought about new nanomaterials as SERS substrates. The CE enhancement is associated with molecular polarizability and it is affected by intermolecular or metal-to-molecule chemical interactions.

Efforts to comprehend the CE mechanism and to increase its influence in Raman signal enhancement have been focused on charge transfer. When electrons move from a metal surface to a molecule and thus the molecule becomes excited, the electron density of the molecule is redistributed and the polarizability changes, resulting in a selective Raman mode enhancement. Recent studies have provided insight into the mechanism of charge transfer by analyzing various benzene-like derivatives (e.g. pyridine).

However, until now, there has been a continuous demand for SERS performance improvement using Raman signal enhancement due to a CE component.

Meanwhile, a metal nanostructure such as gold and silver may induce localized surface plasmon resonance (LSPR) between incident light and free electrons present inside the metal nanostructure, and the incident light can be highly focused on a pointed tip of the metal nanostructure or a local space between nanostructures. Through the EM enhancement, there may be provided an ultra-high sensitivity SERS substrate capable of detecting trace amounts of hazardous chemical substances or biomarkers by amplifying the Raman signal of a molecule adsorbed on a metal surface through EM enhancement more than $10^6$ times.

Chemical and biomaterial detection using a SERS substrate has a disadvantage in that it is not possible to perform rapid on-site analysis within 5 minutes because measurement is made after a solution containing a target molecule is dropped onto the SERS substrate and dried or because a Raman signal is measured after a target molecule in the solution is induced to a hot spot through passive diffusion.

Conventional techniques for increasing the density of plasmonic hot spots are typically as follows. The techniques may be classified into (1) a two-dimensional multilayered metal nanostructure substrate that is manufactured by forming a metal (Au or Ag) film and an insulating film on a flat substrate as a metallic mirror structure and then applying metal nanoparticles synthesized in an aqueous solution or performing vacuum deposition of metal nanoparticles, (2) a three-dimensional multilayered metal nanostructure substrate that is manufactured by performing vacuum deposition of a metal film on a substrate where polymer nanopillars are formed, forming Au-polymer nanopillars, and then continuously depositing an insulating film and metal nanoparticles, and (3) a three-dimensional nanoporous Au substrate that is manufactured by performing vacuum deposition of Au and Ag at the same time, forming an Ag—Au film, and then performing selective removal of Ag.

As a document related to the technique of (1), there is "Single-molecule strong coupling at room temperature in plasmonic nanocavities," described in [Nature, 2016, 535, 127-130]. The above technique is to form a two-dimensional plasmonic multilayered structure by performing vacuum deposition of Cr to a thickness of 5 nm and Au to a thickness of 70 nm on a flat Si substrate, forming a flat Au film, forming an insulating layer (cucurbituril) with a thickness of 0.9 nm as an insulating film, and then finally applying Au nanoparticles synthesized in an aqueous solution. By using the above structure, methylene blue molecules, which are probe molecules to be analyzed by SERS, may be inserted into the insulating layer, and thus it is possible to detect an ultra-sensitive SERS signal of methylene blue by a strong electromagnetic field concentration phenomenon formed in nanogaps between the Au film and the Au nanoparticles.

As a document related to the technique (2), there is a document entitled "Substrate which has multiple nanogaps and fabricating method for the same" disclosed in Korean Patent No. 10-1639686. In this document, a substrate including a protruding structure and a substrate including an intermediate insulating layer and metal-containing nanoparticles formed on the intermediate insulating layer wherein a metal-containing thin film is formed on the protruding structure may be provided. The metal-containing nanoparticles may provide a highly-sensitive SERS substrate by forming a plurality of nanogaps between other metal-containing nanoparticles and the metal-containing thin film.

As a document related to the technique (3), there is U.S. Pat. No. 9,593,981 B2. A three-dimensional nanoporous SERS substrate may be provided by simultaneously vacuum-depositing Au and Ag, forming an Ag—Au film, and selectively removing Ag.

The above documents are directed to providing a high-performance SERS substrate and require an additional analysis process for performing analysis.

CITATION LIST

Patent Literature

[PLT 1] Chinese Patent Publication No. 106770175
(PLT 2) Korean Patent No. 10-1639686
(PLT 3) U.S. Patent Publication U.S. Pat. No. 9,593,981 B2

Non-Patent Literature (NPL 1) Single-molecule strong coupling at room temperature in plasmonic nanocavities, Nature, 2016, 535, 127-130

SUMMARY OF THE INVENTION

The present invention is directed to providing a Raman signal enhancement method that remarkably enhances a Raman signal using an anion-π interaction.

The present invention is also directed to providing an analyte detection method capable of accurately detecting trace amounts of samples using the Raman signal enhancement method.

The present invention is also directed to providing a spectroscopy analysis kit capable of remarkably enhancing a Raman signal using an anion-π interaction.

The present invention is also directed to providing a Raman spectroscopy apparatus capable of accurately detecting trace amounts of samples by including the spectroscopy analysis kit.

The present invention is also directed to providing a substrate including a three-dimensional nanoplasmonic composite structure composed of a plasmonic nanostructure and a target molecule.

The present invention is also directed to providing an apparatus capable of analyzing a Raman signal in real time for a process of forming a three-dimensional nanoplasmonic composite thin film composed of a plasmonic nanostructure and a target molecule.

The present invention is also directed to providing a method of efficiently fabricating a substrate including a three-dimensional nanoplasmonic composite structure.

The present invention is also directed to providing a rapid analysis method using a three-dimensional nanoplasmonic composite structure.

The present invention is not limited to the above objectives, but other objectives not described herein may be clearly understood by those skilled in the art from the detailed description of the invention.

According to an aspect, there is provided a substrate including a three-dimensional (3D) nanoplasmonic composite structure, the substrate including a base substrate, a plurality of metal-containing nanostructures formed on the base substrate, and a 3D nanoplasmonic composite thin film formed on the metal-containing nanostructures and composed of a plasmonic nanostructure and a target molecule.

According to an embodiment, the plurality of metal-containing nanostructures may include at least one of a plurality of nanopillars and a plurality of nanoprotrusions spaced apart from one another and formed on the base substrate and a metal-containing thin film formed on a surface of the at least one of the plurality of nanopillars and the plurality of nanoprotrusions, and the metal-containing thin film may be made of Au or an alloy thereof.

According to an embodiment, the plasmonic nanostructure may be a metal-containing nanoparticle.

According to an embodiment, the target molecule may be an organic molecule bonded by covalent bonding or electrostatic attraction.

According to an embodiment, the organic molecule may be a chemical substance or a pathogen.

According to an embodiment, the 3D nanoplasmonic composite thin film may have a thickness of 1 nm to 100 nm.

According to an embodiment, the 3D nanoplasmonic composite thin film may be formed by a solution process.

According to an embodiment, the 3D nanoplasmonic composite thin film may be formed by electrochemical deposition.

According to an embodiment, the 3D nanoplasmonic composite thin film may be porous in three dimensions.

According to an embodiment, the nanostructure may be formed through ion beam treatment, plasma etching, soft lithography, nanoimprint lithography, photolithography, or holographic lithography.

According to an embodiment, the ion beam treatment may be performed using an ion beam composed of carbon, oxygen, nitrogen, fluorine, argon, chlorine, sulfur, or a compound thereof.

According to another aspect, there is provided an electrochemical deposition-Raman analysis integration system including a base substrate with the described metal-containing nanostructure formed thereon, an electrochemical cell configured to accommodate an electrolyte solution and the base substrate, a reference electrode and a counter electrode provided in the electrochemical cell, a power supply source configured to apply a voltage between the counter electrode and the metal-containing nanostructure, which is a working electrode, a light source configured to emit light to the base substrate, and a detector configured to detect a Raman spectral signal.

According to an embodiment, the metal-containing nanostructure, which is a working electrode, may be an Au nanopillar electrode.

According to an embodiment, a 3D nanoplasmonic composite thin film composed of a plasmonic nanostructure and a target molecule may be formed on the metal-containing nanostructure formed on the base substrate, and the 3D nanoplasmonic composite thin film may be formed on the metal-containing nanostructure formed on the base substrate by: electrochemical deposition of the plasmonic nanostructure and chemical bonding or electrostatic attraction of the target molecule.

According to an embodiment, the 3D nanoplasmonic composite thin film may be formed by: electrochemical deposition of a precursor $HAuCl_4$ and chemical bonding or electrostatic attraction between Au and the target molecule.

According to an embodiment, in the electrochemical deposition-Raman analysis integration system, Raman analysis may be possible simultaneously with the formation of the 3D nanoplasmonic composite thin film by electrochemical deposition.

According to an embodiment, the electrochemical deposition-Raman analysis integration system may perform Raman analysis within one minute.

According to an embodiment, a voltage of −0.1 to 0.5 V may be applied to the electrochemical deposition-Raman analysis integration system.

According to an embodiment, the electrochemical deposition-Raman analysis integration system may have a limit of detection of 1 ppb or less.

According to still another aspect, there is provided a method of fabricating a substrate including a three-dimensional (3D) nanoplasmonic composite structure, the method including II-i) preparing a base substrate with the above-described metal-containing nanostructure formed thereon in an electrochemical cell, II-ii) preparing an electrolyte solution including a target molecule and a precursor of a plasmonic nanostructure in the electrochemical cell, and II-iii) forming a 3D nanoplasmonic composite thin film composed of a plasmonic nanostructure and a target molecule on the metal-containing nanostructure by applying a voltage to an electrode.

According to an embodiment, in step II-ii), the electrolyte solution may contain $HAuCl_4$ and a target molecule.

According to an embodiment, in step II-iii), electrochemical deposition may be performed by applying a voltage between the counter electrode and the metal-containing nanostructure, which is the working electrode.

According to an embodiment, the voltage applied in step II-iii) may range from −0.1 to 0.5 V.

According to still another aspect, there is provided a real-time Raman spectroscopy analysis method including II-i) preparing a base substrate with the above-described metal-containing nanostructure formed thereon in an electrochemical cell of an electrochemical deposition system, II-ii) preparing an electrolyte solution including an analyte and a precursor of a plasmonic nanostructure in the electrochemical cell, II-iii) forming a three-dimensional (3D) nanoplasmonic composite thin film composed of a plasmonic nanostructure and a target module on the metal-containing nanostructure by applying a voltage to an electrode, and II-iv) performing Raman analysis by emitting light to the base substrate on which the 3D nanoplasmonic composite thin film is formed.

According to an embodiment, the precursor of the plasmonic nanostructure may be a metal complex ion, and a Raman signal may be enhanced by an anion-π interaction between the analyte and the metal complex ion.

According to an embodiment, the analyte may be a substance with π-electrons.

According to an embodiment, the analyte may be an aromatic compound or a material containing the same.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a diagram schematically showing a Raman signal (CE) principle according to the present invention.

In an electrochemical SERS (EC-SERS) platform in which a metallic SERS substrate acts as an electrode, charge transfer can be made possible by controlling the Fermi energy of the metal by the application of an external electric potential. Until now, related studies have been limitedly applicable only to molecules which have medium redox potentials at which charge transfer can be made within a typical electric potential range.

As a result of extensive research, the researchers of the present invention have developed a charge transfer-mediated CE mechanism by adjusting the chemical properties of Raman active molecules and introducing non-covalent intermolecular interactions that enable charge transfer in electrochemistry (EC)-SERS, and have completed the present invention by discovering a method of enhancing signals in SERS using the CE mechanism.

Figure 1:
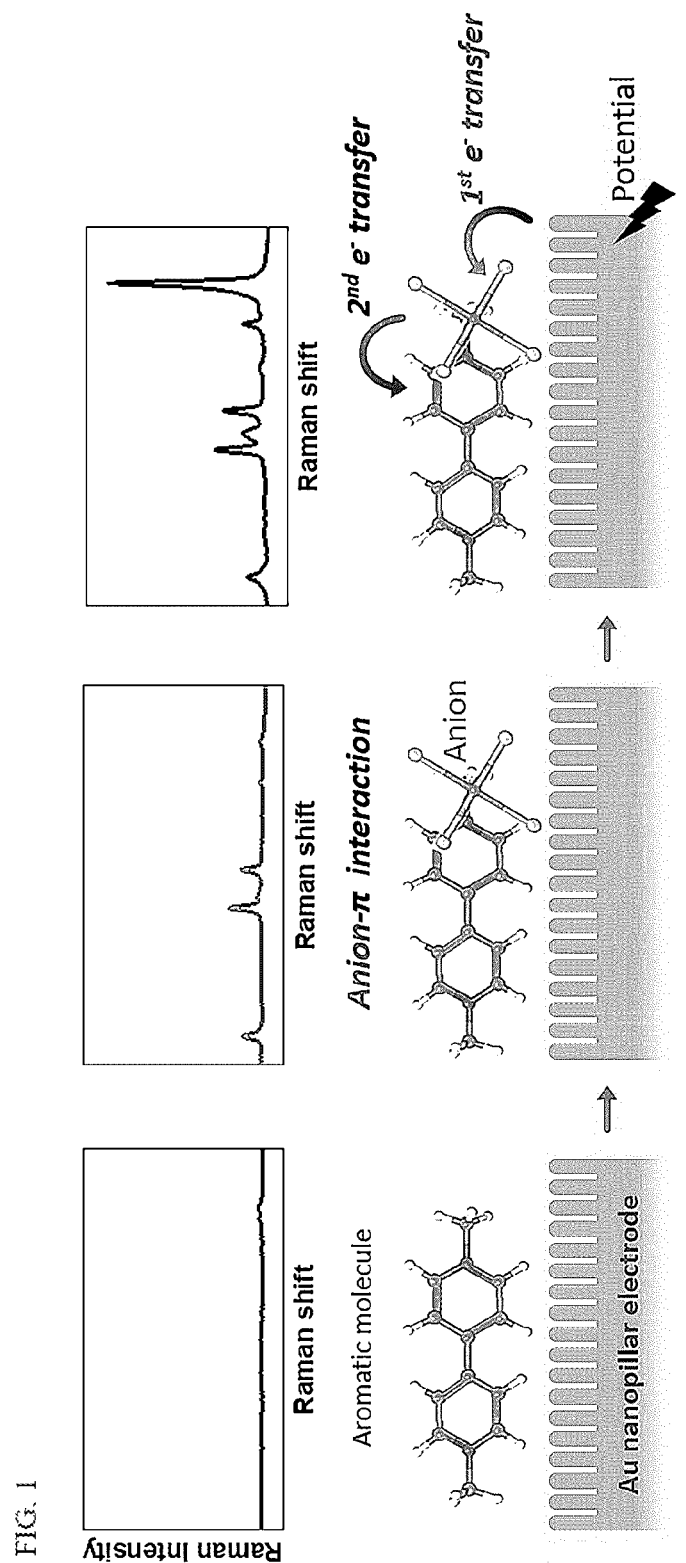
FIG. 1 is a diagram schematically showing a Raman signal (CE) enhancement principle according to the present invention.

As shown in FIG. 1, when a metal complex ion capable of providing anions is brought into contact with an analyte including an aromatic π system provided on a plasmonic substrate electrode, the polarizability of the π system of the molecule is changed in the presence of the anions, and thus a Raman signal can be enhanced through intermolecular interactions, i.e., anion-π interactions.

Also, when an external electric potential is applied to the electrode while the analyte and the metal complex ion are in contact, the Raman signal can be remarkably enhanced by a synergistic effect between the anion-π interaction and the application of the external electric potential.

Therefore, according to an aspect, the Raman signal enhancement method of the present application includes I-i) providing a plasmonic substrate electrode, I-ii) mixing a metal complex ion and an analyte on the electrode, and I-iii) applying an electric potential to the electrode.

Step I-i) is a step of providing a plasmonic substrate electrode acting as an electrode to a plasmonic substrate.

The plasmonic substrate electrode may have various structures when SERS is active. The present invention is not limited thereto, and the electrode may include at least one of a metal-containing nanoparticle, a metal-containing thin film, and a metal-containing nanostructure.

The present invention is not limited thereto. At least one of Au, Ag, Al, Co, Cu, Fe, Li, Ni, Pd, Pt, Rh, Ru, and alloys thereof may be used as the metal, and Au, Ag, or alloys thereof may be suitable in terms of Raman signal enhancement.

The nanostructure is not particularly limited in shape as long as it is a structure in which a plurality of nanogaps that induce surface plasmon resonance are formed therebetween. The present invention is not limited thereto, and the nanostructure may be at least one of nanoprotrusions, nanopillars, nanowires, nanodimples, and nano-embossing, and the nanopillars may be suitable in terms of Raman signal enhancement.

The plasmonic substrate electrode may be fabricated using a known method. One of a plasma etching process, soft lithography, embossing, nanoimprint lithography, photolithography, and interference lithography may be used, and the present invention is not limited thereto.

In the embodiment of the present application, a nanopillar is formed on a polymer substrate by plasma-etching, and a metal-containing film having a nanogap structure is formed on the nanopillar by sputtering. Also, the plasmonic substrate may be formed by vacuum deposition using thermal evaporation and chemical vapor deposition, but the present invention is not limited thereto. The thickness of the plasmonic substrate electrode may be adjusted upon the vacuum deposition by controlling conditions such as a deposition time.

Step I-ii) is a step of mixing a metal complex ion and an analyte on the electrode.

The analyte may be a substance with π-electrons. When an anion is provided to the substance with π-electrons, the polarizability of the π system of a molecule may be changed, and a Raman signal may be enhanced by an intermolecular interaction, i.e., an anion-π interaction.

The present invention is not limited thereto, and an aromatic compound with π-electrons or a substance containing the same may be suitable as the analyte. The substances have π-electrons and thus can be detected with high sensitivity upon analysis even when they are present in trace amounts. In particular, it is possible to enhance the Raman signal of a molecule with an electron-deficient aromatic ring.

The present invention is not limited thereto, and the analyte may be at least one of paraquat, diquat, brilliant green, and TBZ. The substances have π-electrons and thus can be detected with high sensitivity upon analysis even when they are present in trace amounts.

More specifically, it was ascertained that the Raman signal of $PQ^{2+}$ was significantly increased when a metal complex ion intervened in the interaction.

Accordingly, the present invention may provide a method of rapidly detecting herbicide components remaining in beverages such as coffee at the site and thus may be widely used for rapid analysis of harmful components.

The metal complex ion is not particularly limited as long as it is a metal complex ion capable of providing an anion. The present invention is not limited thereto, and the metal complex ion may include $AuCl_4^-$ or $Au(CN)_2^-$, and $AuCl_4^-$ may be suitable for high-sensitivity detection of an analyte.

The analyte and the metal complex ion may be mixed on the electrode after providing the analyte to the substrate first and then providing the metal complex ion, after providing the analyte to the substrate to which the metal complex ion is provided, or after simultaneously providing the analyte and the metal complex ion to the electrode.

Step I-iii) is a step of applying an electric potential to the electrode.

Also, when an external electric potential is applied to the electrode while the analyte and the metal complex ion are in contact, the Raman signal can be remarkably enhanced by a synergistic effect between the anion-π interaction and the application of the external electric potential. That is, the signal enhanced by the anion-π interaction may be further amplified in the EC-SERS system in which an external electric potential to induce electron transfer mediated in two steps is applied. It was ascertained that the electron transfer changed the polarizability of $PQ^{2+}$, resulting in a signal amplified 45 times compared to the initial SERS signal.

The electric potential may be set in an effective range by a person skilled in the art according to the type of analyte. The effective electric potential range may be set in consideration of (1) the redox potentials of the analyte and the metal complex ion, (2) an electric potential at which the electrode itself is oxidized or reduced, and (3) an electric potential at which a solvent itself is oxidized or reduced. Therefore, the effective potential range may be an electric potential that does not cause unnecessary reactions (e.g., reduction of dissolved oxygen) while allowing electrons to be transferred from the electrode to metal complex ions and the electrons to be transferred to the analyte. The present invention is not limited thereto, and when the analyte is paraquat and the metal complex ion is $AuCl_4^-$, the paraquat may be efficiently detected with high sensitivity by applying an electric potential of 0.1 V to less than 0.7 V in step I-iii).

According to another aspect, the analyte detection method of the present application includes I-i) providing a plasmonic substrate electrode, I-ii) mixing a metal complex ion and an analyte on the electrode, I-iii) applying an electric potential to the electrode, and I-iv) detecting a Raman signal by emitting light to the analyte.

With the Raman signal enhancement method of the present application, it is possible to detect an analyte with high sensitivity by enhancing the Raman signal of the analyte.

Steps I-i) to I-iii) are described above in association with the Raman signal enhancement method, and thus a detailed description thereof will be omitted.

Step I-iv) is a step of detecting a Raman signal by emitting light to the analyte mixed with the metal complex ion. The Raman signal may be enhanced by an anion-π interaction due to the analyte and the metal complex ion. When an external electric potential is applied, the Raman signal may be remarkably enhanced by a synergy effect between the anion-π interaction and the application of the external electric potential. Therefore, even trace amounts of analyte can be detected with high sensitivity.

According to another aspect, a spectroscopy analysis kit of the present application includes a plasmonic substrate electrode, a metal complex ion to be mixed with an analyte on the electrode, and an electric potential applying unit configured to apply an electric potential to the electrode.

In the spectroscopy analysis kit, the electrode may include at least one of a metal-containing nanoparticle, a metal-containing thin film, and a metal-containing nanostructure.

In the spectroscopy analysis kit, the nanostructure may be at least one of nanoprotrusions, nanopillars, nanowires, nanodimples, and nano-embossing.

In the spectroscopy analysis kit, the analyte may be a substance with π-electrons.

In the spectroscopy analysis kit, the analyte may be an aromatic substance. In the spectroscopy analysis kit, the metal complex ion may include $AuCl_4^-$ or $Au(CN)_2^-$.

In the spectroscopy analysis kit, the metal complex ion may be integrated on the electrode or may be provided as an element to be added when an analyte is detected.

In the spectroscopy analysis kit, the electric potential applying unit is not particularly limited as long as it can apply an electric potential to the plasmonic substrate electrode of the present application, and may be configured using a known electric potential applying member.

The spectroscopy analysis kit may be a substrate for surface-enhanced Raman scattering or a substrate for surface-enhanced infrared absorption spectroscopy. The present application can also be applied to infrared (IR) spectroscopy analysis as well as Raman analysis using visible light.

According to still another aspect, a Raman spectroscopy apparatus of the present application includes a light source; a spectroscopy analysis kit described herein; and a detector configured to detect a Raman spectrum.

Well-known light sources and detectors may be used as other components of the Raman spectroscopy apparatus such as the light source and the detector, and a detailed description thereof will be omitted.

Also, the present invention relates to a substrate including a three-dimensional (3D) nanoplasmonic composite structure, a method of fabricating the same, and a rapid analysis method using the same. More specifically, the present invention relates to a substrate including a 3D plasmonic-nanostructure/target-molecule composite thin film composed of an analyte and a plasmonic nanostructure and formed by applying a voltage to a plasmonic electrode in an electrochemical cell including an analyte and a metal precursor to induce an analyte molecule on the electrode and performing electrochemical deposition, a method of fabricating the same, and a rapid analysis method using the same.

Figure 10:
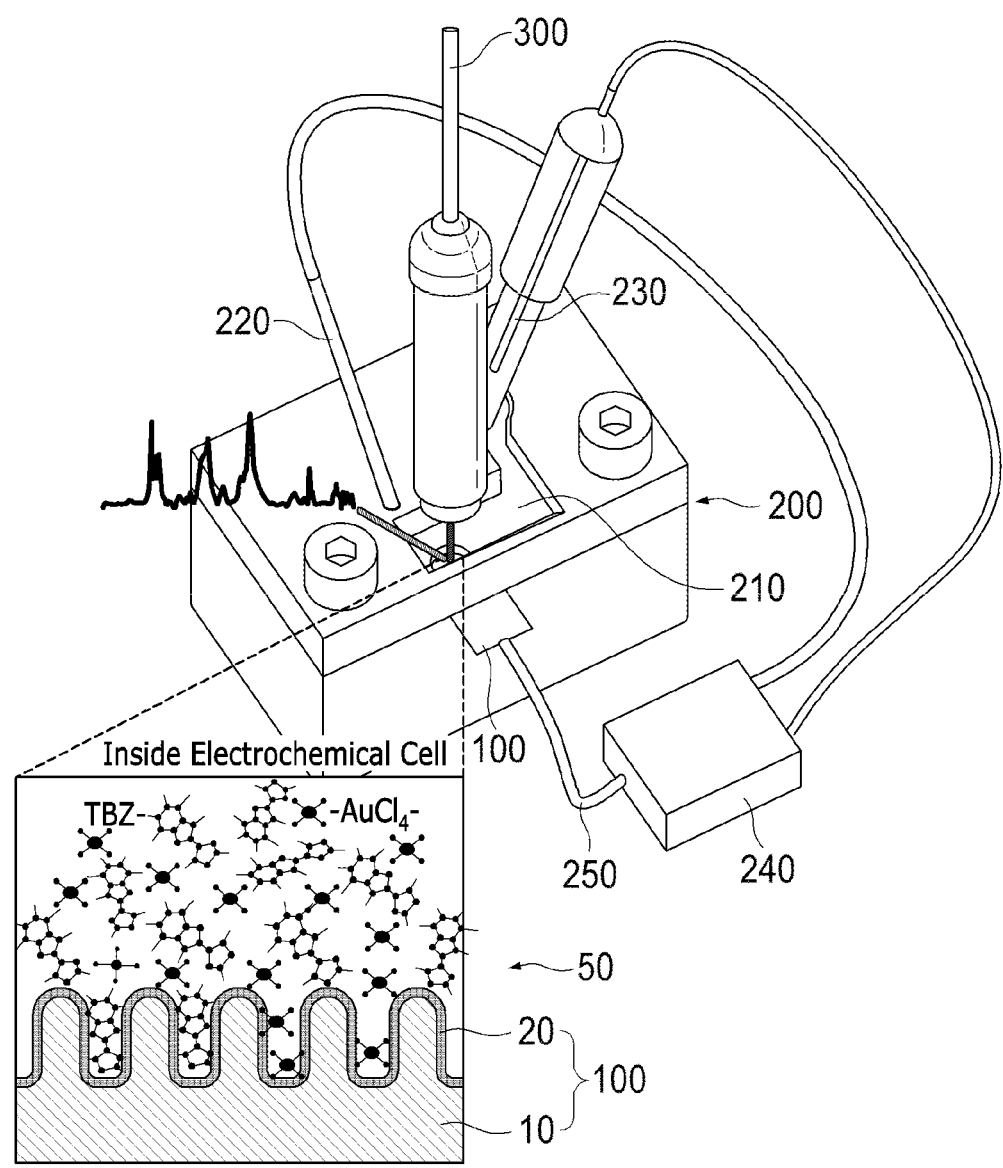
FIG. 10 is a diagram schematically showing an electrochemical deposition-Raman analysis integration system capable of analyzing a Raman signal in real time during an electrochemical deposition process in an electrochemical cell including an analyte and a metal precursor according to an embodiment of the present invention.
Figure 11:
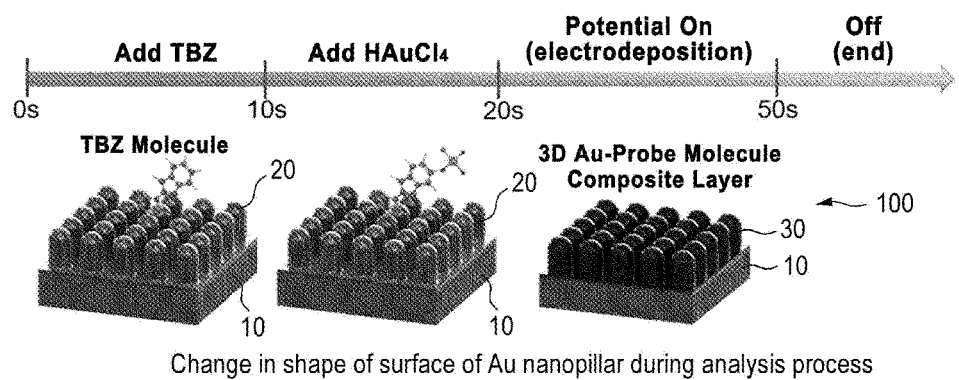
FIG. 11 is a diagram schematically showing, as a change in the shape of a nanopillar surface, an analysis process for rapid detection of a target molecule within one minute by using the electrochemical deposition-Raman analysis integration system of FIG. 10.

FIG. 10 is a diagram schematically showing an electrochemical deposition-Raman analysis integration system capable of analyzing a Raman signal in real time during an electrochemical deposition process in an electrochemical cell including an analyte and a metal precursor according to an embodiment of the present invention, and FIG. 11 is a diagram schematically showing, as a change in the shape of a nanopillar surface, an analysis process for rapid detection of a target molecule within one minute by using the electrochemical deposition-Raman analysis integration system of FIG. 10.

Referring to FIGS. 10 and 11, a substrate including a 3D nanoplasmonic composite thin film includes a base substrate 10, a plurality of metal-containing nanostructures 20 formed on the base substrate 10, and a 3D nanoplasmonic composite thin film 30 composed of a plasmonic nanostructure and a target molecule and formed on the metal-containing nanostructure 20.

The base substrate 10 may be formed of a polymer, glass, ceramic, metal, paper, resin, silicon, or metal oxide.

The present invention is not limited thereto, and the plurality of metal-containing nanostructures 20 may include at least one of a plurality of nanopillars and a plurality of nanoprotrusions spaced apart from one another and formed on the base substrate 10 and a metal-containing thin film formed on a surface of the at least one of the plurality of nanopillars and the plurality of nanoprotrusions.

The nanopillars or nanoprotrusions may be formed by processing the base substrate 10 and may be made of the same material as that of the base substrate 10. At this time, a polymer from which nanoprotrusions can be easily formed may be suitable for the base substrate 10. In an embodiment of the present invention, polyethylene terephthalate (PET) is used among polymer substrates.

The metal-containing nanostructure 20 may contain Au or a precious-metal alloy thereof and may be formed by coating a nanopillar or a nanoprotrusion formed on the base substrate 10 with Au or a precious-metal alloy thereof. The present invention is not limited thereto, and a nanopillar form may be more suitable. The metal-containing nanostructure 20 serves as a working electrode upon electrochemical deposition.

The metal-containing nanostructure 20 may be formed through ion beam treatment, plasma etching, soft lithography, nanoimprint lithography, photolithography, or holographic lithography.

The ion beam treatment may be performed using an ion beam composed of carbon, oxygen, nitrogen, fluorine, argon, chlorine, sulfur, or a compound thereof.

As described above, in the case of the 3D nanoplasmonic composite thin film 30, a target molecule to be analyzed is adsorbed to form a 3D porous composite thin film integrally with the 3D plasmonic nanostructure, and thus it is possible to enhance the Raman signal of the adsorbed molecule. Also, a process of forming a spectroscopic substrate and an analysis process may be integrally performed. Thus, rapid on-site diagnosis is possible, no additional analysis process is required, and real-time Raman monitoring is also possible.

The plasmonic nanostructure may be a metal-containing nanoparticle and a metal-containing thin film made of metal-containing nanoparticles. The present invention is not limited thereto, and the plasmonic nanostructure may be a nanoparticle of Au and an alloy thereof. The plasmonic nanostructure is formed through electrochemical deposition.

The target molecule, which is a molecule of an analyte, is not particularly limited as long as it can form a composite thin film along with the plasmonic nanostructure. The target molecule may be an organic molecule to be bonded to the plasmonic nanostructure by covalent bonding or electrostatic attraction.

The organic molecule may be a chemical substance or a pathogen. The organic molecule is not particularly limited as long as it can form covalent bonding with the plasmonic nanostructure. For example, the organic molecule may be thiabendazole (TBZ). The pathogen is not particularly limited as long as it can be bonded to the plasmonic nanostructure 20 by electrostatic attraction. The present invention is not limited thereto, and the pathogen may be a pathogenic virus or bacteria. The virus may be an H1N1 influenza virus or may be a surface protein of the virus. The surface protein may be hemagglutinin or neuraminidase.

The 3D nanoplasmonic composite thin film 30 may have a thickness of 1 nm to 100 nm. When the thickness of the 3D nanoplasmonic composite thin film 30 is less than 1 nm, it may be difficult to form the composite thin film, and furthermore, it may be difficult to form a 3D porous shape such that the Raman signal enhancement effect may not occur. When the thickness of the 3D nanoplasmonic composite thin film 30 is more than 100 nm, the Raman signal enhancement effect corresponding to the increase in thickness may be insignificant, and the economic feasibility may be decreased.

The 3D nanoplasmonic composite thin film 30 may be formed through a solution process. Furthermore, the 3D nanoplasmonic composite thin film 30 may be formed through electrochemical deposition.

The 3D nanoplasmonic composite thin film 30 may be porous. As described above, in the process of forming the 3D nanoplasmonic composite thin film 30, a target molecule to be analyzed may be adsorbed to form a porous composite thin film. Also, a pit 32 may be formed on the surface of the porous composite thin film 30. Due to the above-described structure, the density of the nanogap is increased, and the target molecule is present inside the 3D porous plasmonic nanostructure. Thus, it is possible to improve the Raman signal enhancement effect.

Referring to FIG. 10, an electrochemical deposition-Raman analysis integration system 200 includes a base substrate 100 in which the above-described metal-containing nanostructure 20 is formed; an electrochemical cell 210 accommodating the base substrate 100 and an electrolyte solution; a counter electrode 220 and a reference electrode 230 provided in the electrochemical cell 210; a power supply source 240 configured to apply a voltage between the counter electrode 220 and the metal-containing nanostructure 20, which is a working electrode; a light source 300 configured to emit light to the base substrate 100; and a detector configured to detect a Raman spectral signal.

The present invention is not limited thereto, and the metal-containing nanostructure 20, which is the working electrode, may be an Au nanopillar electrode.

The base substrate 100 with the formed metal-containing nanostructure 20, which is the working electrode, is connected to the power supply source 240 through a conductive wire 250.

The counter electrode 220 is an electrode for causing a current to flow in an electrolyte solution between the counter electrode 220 and the working electrode and causing a reaction at an interface between the working electrode and the electrolyte solution. For example, the counter electrode may be a Pt electrode.

The reference electrode 230 is an electrode that is used as a reference when determining the electric potential of the working electrode. For example, the reference electrode 230 may be an Ag/AgCl electrode.

As described above, when the voltage is applied, the 3D nanoplasmonic composite thin film 30 composed of the plasmonic nanostructure and the target molecule is formed on the metal-containing nanostructure 20, and the 3D nanoplasmonic composite thin film 30 may be formed on a plurality of metal-containing nanostructures 20 formed on the base substrate 10 by the electrochemical deposition of the plasmonic nanostructure and the chemical bonding or electrostatic attraction of the target molecule.

The 3D nanoplasmonic composite thin film 30 may be formed by the electrochemical deposition of a precursor $HAuCl_4$ and chemical bonding or electrostatic attraction between Au and the target molecule. The present invention is not limited thereto, and the $HAuCl_4$ concentration of 0.5 to 100 mM may be suitable in terms of electrochemical deposition and Raman signal enhancement.

The electrochemical deposition-Raman analysis integration system 200 can perform Raman analysis simultaneously with the formation of the 3D nanoplasmonic composite thin film 30 by electrochemical deposition.

The electrochemical deposition-Raman analysis integration system 200 can perform Raman analysis within one minute. Referring to FIG. 11, it may take 50 seconds to obtain a Raman analysis result simultaneously with the formation of the 3D nanoplasmonic composite thin film 30 by adding TBZ, which is an analyte, and $HAuCl_4$, which is a precursor of the plasmonic nanostructure, and then performing electrochemical deposition.

A voltage of −0.1 to 0.5 V may be applied to the electrochemical deposition-Raman analysis integration system.

The electrochemical deposition-Raman analysis integration system may have a detection limit of 1 ppb or less and 0.05 ppb or less at a minimum.

A known light source and detector of a Raman spectroscopy analysis apparatus may be used as the light source 300 and the detector (not shown).

Referring to FIGS. 10 and 11, a method of fabricating a substrate including a 3D nanoplasmonic composite structure includes II-i) preparing a base substrate 100 on which the above-described metal-containing nanostructure 20 is formed for an electrochemical cell 210 of an electrochemical deposition-Raman analysis integration system 200; II-ii) preparing an electrolyte solution including a target molecule and a precursor of a plasmonic nanostructure for the electrochemical cell 210; and II-iii) forming a 3D plasmonic composite thin film 30 composed of a plasmonic nanostructure and a target molecule on the metal-containing nanostructure 20 by applying a voltage to an electrode.

In step II-i), the base substrate 100 with the formed metal-containing nanostructure 20 is placed on and prepared for the electrochemical cell 210 of the electrochemical deposition-Raman analysis integration system 200.

In step II-ii), an electrolyte solution including a target molecule and a precursor of a plasmonic nanostructure precursor is prepared for the electrochemical cell 210. The electrolyte solution may contain $HAuCl_4$ and a target molecule.

In step II-iii), a voltage is applied to an electrode to form 3D plasmonic composite thin film 30 on the metal-containing nanostructure 20. In step II-iii), electrochemical deposition may be performed by applying a voltage between the counter electrode 220 and the metal-containing nanostructure 20, which is the working electrode.

In step II-iii), the applied voltage may range from −0.1 to 0.5 V. The voltage range may be suitable in terms of electrochemical deposition and Raman signal enhancement.

According to still another aspect, there is provided a real-time Raman spectroscopy analysis method including II-i) preparing a base substrate 100 on which the metal-containing nanostructure 20 is formed for an electrochemical cell 210 of an electrochemical deposition system 200, II-ii) preparing an electrolyte solution including a precursor of a plasmonic nanostructure and a target molecule for the electrochemical cell 210, II-iii) forming a 3D nanoplasmonic composite thin film 30 composed of a plasmonic nanostructure and a target molecule on the metal-containing nanostructure 20 by applying a voltage to an electrode; and II-iv) performing Raman spectroscopy analysis by emitting light from a light source 300 to the base substrate 100 with the 3D nanoplasmonic composite thin film 30 formed thereon.

In step II-i), the base substrate 100 with the formed metal-containing nanostructure 20 is placed on and prepared for the electrochemical cell 210 of the electrochemical deposition-Raman analysis integration system 200.

In step II-ii), an electrolyte solution including a target molecule and a precursor of a plasmonic nanostructure precursor is prepared in the electrochemical cell 210. The electrolyte solution may contain $HAuCl_4$ and a target molecule.

In step II-iii), a voltage is applied to an electrode to form a 3D plasmonic composite thin film 30 on the metal-containing nanostructure 20. In step II-iii), electrochemical deposition may be performed by applying a voltage between the counter electrode 220 and the metal-containing nanostructure 20, which is the working electrode.

In step II-iii), the applied voltage may range from −0.1 to 0.5 V. The voltage range may be suitable in terms of electrochemical deposition and Raman signal enhancement.

In step II-iv), light is emitted from the light source 300 to the base substrate 100 with the 3D plasmonic composite thin film 30 formed thereon to perform Raman spectroscopy analysis. The Raman spectroscopy analysis may be performed using a known light source and detector.

As described above, the Raman spectroscopy analysis method of the present application may include performing Raman spectroscopy analysis simultaneously with the formation of the spectroscopy analysis substrate and the adsorption of the target molecule.

As described above, according to the present application, a working electrode made of an Au nanopillar is placed under an electrochemical cell, and an electrolyte solution containing a harmful molecule to be analyzed (e.g., thiabendazole (TBZ)) and an Au precursor ($HAuCl_4$) for forming a thin film that is electrochemically deposited with Au is included in the electrochemical cell. By applying a voltage between the Au nanopillar working electrode and the Pt counter electrode compared to the Ag/AgCl reference electrode, Au electrochemical deposition and Raman spectroscopy analysis may be simultaneously performed in the electrolyte solution. Therefore, real-time on-site analysis and monitoring is possible. Meanwhile, the above description has focused on the Raman spectroscopy analysis, but the substrate of the present application is not excluded from being used in various spectroscopy analysis methods.

Hereinafter, the present invention will be described in detail through embodiments.

Embodiment I

1. Materials and Method 1-1. Materials

Paraquat dichloride, gold chloride trihydrate ($HAuCl_4 \cdot 3H_2O$), potassium dicyanoaurate ($K[Au(CN)_2]$), potassium phosphate monobasic ($KH_2PO_4$), and potassium phosphate dibasic trihydrate ($K_2HPO_4 \cdot 3H_2O$) were purchased from Sigma-Aldrich (St. Louis, MO, USA). Sodium chloride (NaCl) was purchased from Samchun Chemicals (Pyeongtaek, Korea), deionized water (DIW, >18MΩ•cm) was purchased from Human UP (Human Corporation), and a pH indicator solution was purchased from EMD Millipore Corporation (Darmstadt, Germany). A phosphate buffer solution (0.1M, pH 7.18) was prepared using potassium phosphate monobasic ($KH_2PO_4$) and potassium phosphate dibasic trihydrate ($K_2HPO_4 \cdot 3H_2O$).

1-2. Fabrication of Au SERS Substrate

A SERS substrate with a thickness of 250 μm was fabricated by depositing Au on a PET substrate. The PET substrate was pretreated with Ar plasma using a 13.56 MHz Radio Frequency (RF) ion etching apparatus. Plasma power for the pretreatment was 100 W. An Au film having a nanogap structure was deposited to a thickness of 100 nm on a nanopillar generated by the Ar plasma. The shape of the Au SERS substrate was checked using a field emission scanning electron microscope (FE-SEM; Joel JSM-6700F).

1-3. EC-SERS Instrumentation and Measurement

The electrochemical measurement was made using an electrochemical cell with a potentiometer (ZIVE SP2, Wonatech), an Au working electrode, an Ag/AgCl reference electrode, and a platinum (Pt) counter electrode. The cell had a perforation of 0.07 $cm^2$ in the center of the geometrical shape, which exposed the Au electrode with an electrolyte solution, and the total volume of the solution containing the cell was 400 μl. The SERS measurement was made in real time using an Ocean Optics handheld probe spectroscopic system (UQEPRO-Raman) containing a 785-nm laser light source. For the EC-SERS measurement, first, the surface of the Au electrode was electrochemically cleaned using cyclic voltammetry (CV). Electric potentials were scanned from 0 to 1.1 V at a scan rate of 0.05 V/s in 400 μl of phosphate buffer solution (0.1 M). The phosphate buffer solution was replaced after cycling, and the measurement was repeated until a reproducible cyclic voltammogram was obtained. Paraquat dichloride and gold chloride trihydrate were dissolved in deionized water. First, 4 μl of $PQ^{2+}$ (500 μM) was added to the NaCl solution (392 μl) in the cell, and the SERS spectrum of $PQ^{2+}$ was obtained over a certain period of time. Then, 4 μl of 100 mM $HAuCl_4$ was added to the electrolyte solution. The final concentrations of $PQ^{2+}$ and AuCl4 were 5 μM and 1 mM, respectively. After careful mixing, the solution was stabilized by emitting laser beams before data acquisition actually started. After collecting the Raman spectrum for 30 seconds, a certain electric potential was applied to the electrode for 60 seconds. The maximum signal enhancement was obtained at 4 seconds during the application of the electric potential, but spectrum collection was performed over the whole time during the application of the electric potential and was continuously performed for 30 seconds after the completion of the application of the electric potential. The laser power used for this measurement was 450 mW, and the integration time was 2 seconds. The electric potentials of all electrodes were recorded for Ag/AgCl.

2. Results 2-1. Chemical Enhancement by Au Anion Complex

Intermolecular forces may change the chemical properties of molecules on the surface of metal (e.g., polarizability, electronic structure) and, as a result, may change the Raman signal. Many Raman-active molecules have heterocycles with electron-attracting substituents that cause their π system to become electron-deficient. These molecules may interact with anions by electrostatics, and their π system may also be polarized by the anions. The anion-π interaction has recently been recognized as a specific intermolecular interaction in many chemical systems. Until now, the effect of anion-π interaction on Raman signal enhancement has not yet been studied in the SERS platform.

Through the present invention, it has been demonstrated that a change in the electronic structure of a molecule due to an anion-π interaction can enhance the Raman signal by increasing the polarizability of the molecule. That is, the influence of the interaction on the chemical amplification of Raman scattering was ascertained.

Figure 2A:
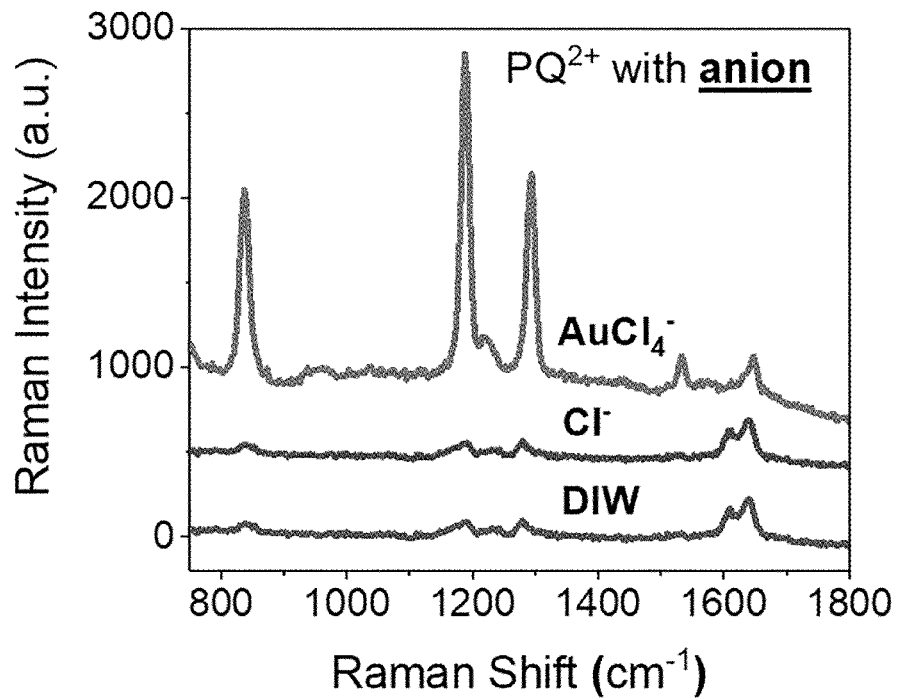
FIG. 2A is a diagram showing Raman intensities corresponding to Raman shifts when $PQ^{2+}$ is measured through SERS along with deionized water, chlorine ion ($Cl^-$), and gold tetrachloride ion ($AuCl_4^-$), respectively.
Figure 2B:
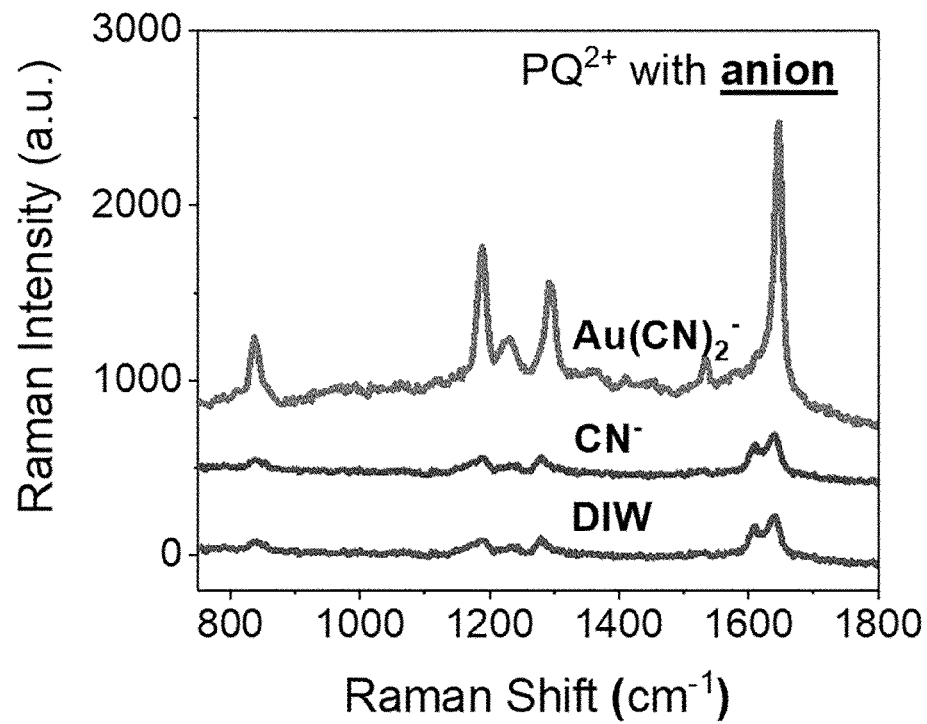
FIG. 2B is a diagram showing Raman intensities corresponding to Raman shifts when $PQ^{2+}$ is measured through SERS along with deionized water, cyan ion ($CN^-$), and gold cyanide ion ($Au(CN)_2^-$), respectively.

FIG. 2A is a diagram showing Raman intensities corresponding to Raman shifts when $PQ^{2+}$ is measured through SERS along with deionized water, chlorine ion ($Cl^-$), and gold tetrachloride ion ($AuCl_4^-$), respectively, and FIG. 2B is a diagram showing Raman intensities corresponding to Raman shifts when $PQ^{2+}$ is measured through SERS along with deionized water, cyan ion ($CN^-$), and gold dicyanide ion ($Au(CN)_2^-$), respectively.

Referring to FIGS. 2A and 2B, paraquat ($PQ^{2+}$) was analyzed as a probe target in the present invention. The $PQ^{2+}$ molecule has two heterocycles containing positively charged tetravalent nitrogen, which contributes to the π-acidity, thereby making it possible to participate in the anion-π interaction.

Similar to an anion-π interaction, a cation-π interaction that occurs between a cation and an aromatic ring system is well known. Several studies have shown that a cation-π interaction tends to be present in the presence of a transition metal cation complex. These metal-ligand complexes may interact strongly with the π system of aromatic molecules, as in the case of monoatomic cations. In this regard, it was predicted that a similar phenomenon could occur in the anion-π interaction as well, and thus a chloride-rich metal complex and a gold tetrachloride ion ($AuCl_4^-$) were introduced. The presence of $AuCl_4^-$ dramatically increased the Raman signal of $PQ^{2+}$ (FIG. 2A), and this increase was observed for C—N (peak shift to 836 $cm^{-1}$), C=C (peak shift to 1188 $cm^{-1}$), and C—C interring (peak shift to 1294 $cm^{-1}$) modes. The intensities of the modes were increased by 20, 25, and 12 times, respectively, which suggested that a metal anion complex can be used as a strongly polarized ion in an anion-π interaction for Raman signal enhancement.

The effect of anion-π interaction on Raman enhancement was further studied by analyzing other anions. In $PQ^{2+}$ in contact with $Au(CN)_2^-$, all signal modes were enhanced. The C—N, C=C, and C—C interring modes were increased by 3 times, 8 times, and 5 times, respectively. On the other hand, the intensity of the C=N mode, which decreased in the presence of $AuCl_4^-$, was amplified by 9 times. The enhancement observed in the presence of $Au(CN)_2^-$ confirmed that an anion-π interaction due to a proposed metal complex is present.

The various changes in the signal intensity of the C—N, C=C, and C—C interring modes are due to the pronounced polarization intensities of $AuCl_4^-$ and $Au(CN)_2^-$. The range of $PQ^{2+}$ polarizability depends on how easily a π-electron cloud is transformed by an anion's electron cloud. $AuCl_4^-$ tends to exhibit a stronger polarization effect than $Au(CN)_2^-$, which is due to the high electron density localization around the Cl atom. In contrast, the electron density of the CN group of $Au(CN)_2^-$ is smaller and causes relatively weak localization. With this relationship, higher Raman enhancement can be expected in the anion-π interaction with $AuCl_4^-$. This difference may explain why the signal intensities of the C—N, C=C, and C—C interring modes are higher in the presence of $AuCl_4^-$ than in the presence of $Au(CN)_2^-$.

Figure 3A:
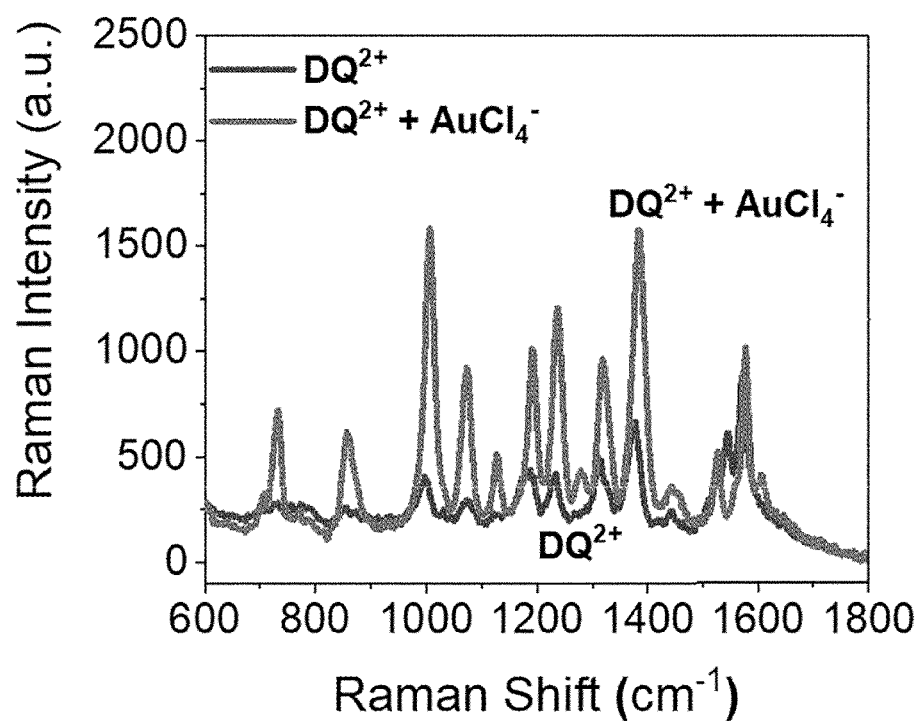
FIGS. 3A to 3C are diagrams showing Raman intensities corresponding to Raman shifts when 5 μM diquat ($DQ^{2-}$), 5 μM brilliant green ($BG^+$), and 5 μM polyvinylpyrrolidone (PVP) are measured through SERS in the presence of $AuCl_4^-$ (1 mM), respectively.
Figure 3B:
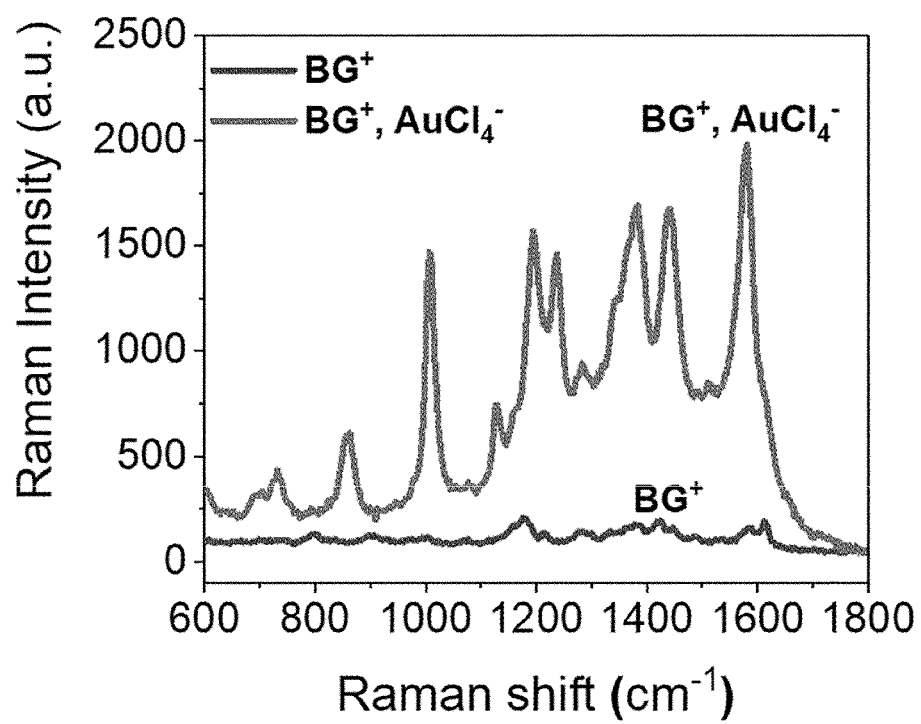
Figure 3C:
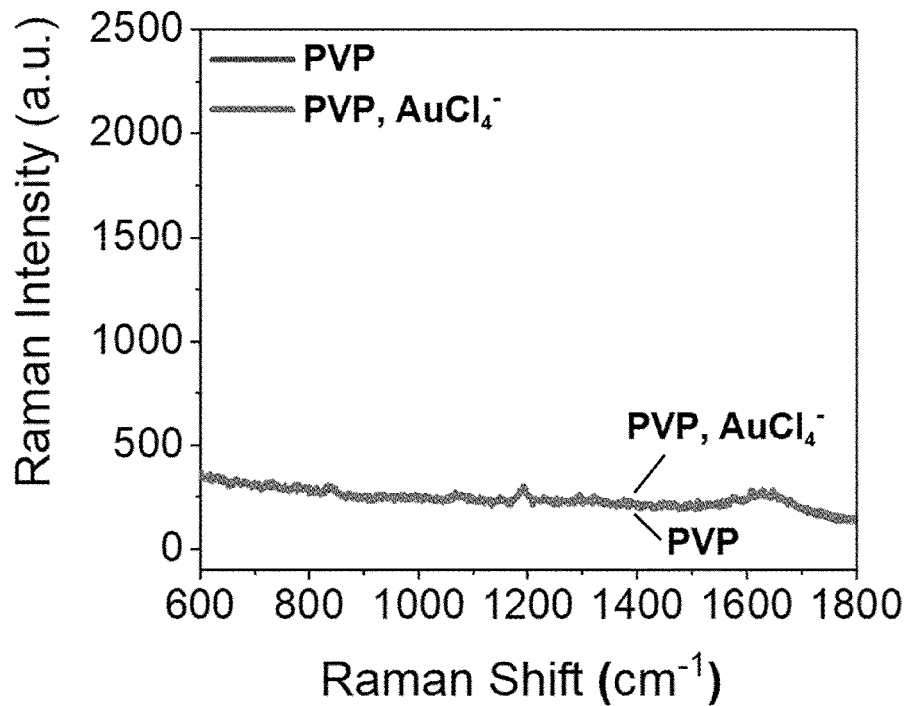

FIGS. 3A to 3C are diagrams showing Raman intensities corresponding to Raman shifts when 5 μM diquat ($DQ^{2+}$), 5 μM brilliant green ($BG^+$), and 5 μM polyvinylpyrrolidone (PVP) are measured through SERS in the presence of $AuCl_4^-$ (1 mM), respectively.

Referring to FIGS. 3A to 3C, the occurrence of anion-π interaction was also confirmed through the case of different molecules (diquat, brilliant green, and polyvinylpyrrolidone). In the presence of $AuCl_4^-$, all Raman modes of the diquat and the brilliant green were enhanced (See FIGS. 3A to 3C). The above observations are consistent with the proposed phenomenon in which diquat and brilliant green are π-electron-deficient aromatic molecules and may interact with $AuCl_4^-$ through anion-π. In the case of PVP, no enhancement was observed due to the lack of π bonds in the ring. As a result, in various SERS applications, it is possible in the presence of $AuCl_4^-$ for an anion-π interaction to enhance the Raman signals of molecules having an electron-deficient aromatic ring.

2-2. Signal Amplification by Application of External Electric Potential

The electrical properties of molecules participating in intermolecular interactions may be greatly modified so that their corresponding energies are suitable for realizing electron excitation or charge transfer. Such cases are verified by changes in redox potential and absorption and emission spectra of molecules upon interaction. Since it was observed that an anion-π interaction affected the electrical structure of π-molecules, the present inventors investigated the effect of $AuCl_4^-$ and $Au(CN)_2^-$ on the electrical properties of $PQ^{2+}$, and more specifically, investigated whether anions can act as catalysts in transferring charges to $PQ^{2+}$ for the purpose of additional Raman enhancement. To this end, the present inventors used an external electric potential to trigger charge (in this case, electron) transfer and observed the Raman signal of the $PQ^{2+}$ molecule alone and the Raman signal of anion-complexed $PQ^{2+}$.

Figure 4A:
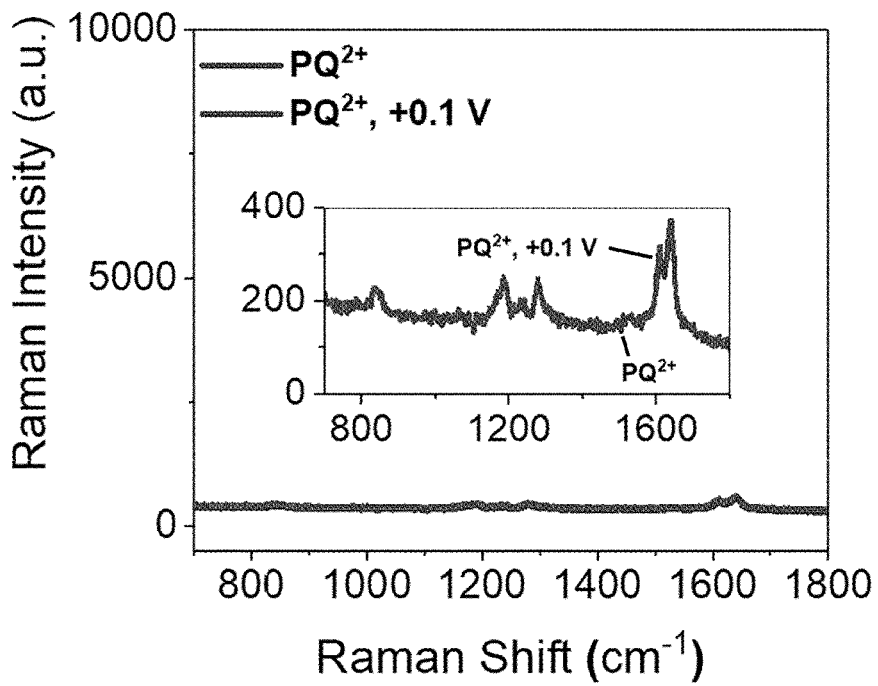
FIGS. 4A to 4C are diagrams showing Raman intensities corresponding to Raman shifts of $PQ^{2+}$ (5 μM) alone, $PQ^{2+}$ (when no electric potential is applied and when +0.1 V is applied) in the presence of $AuCl_4^-$ (1 mM), and $PQ^{2+}$ (when no electric potential is applied and when +0.1 V is applied) in the presence of $Au(CN)_2^-$ (1 mM), wherein a box in the graph of FIG. 4A represents an enlarged SERS spectrum.
Figure 4B:
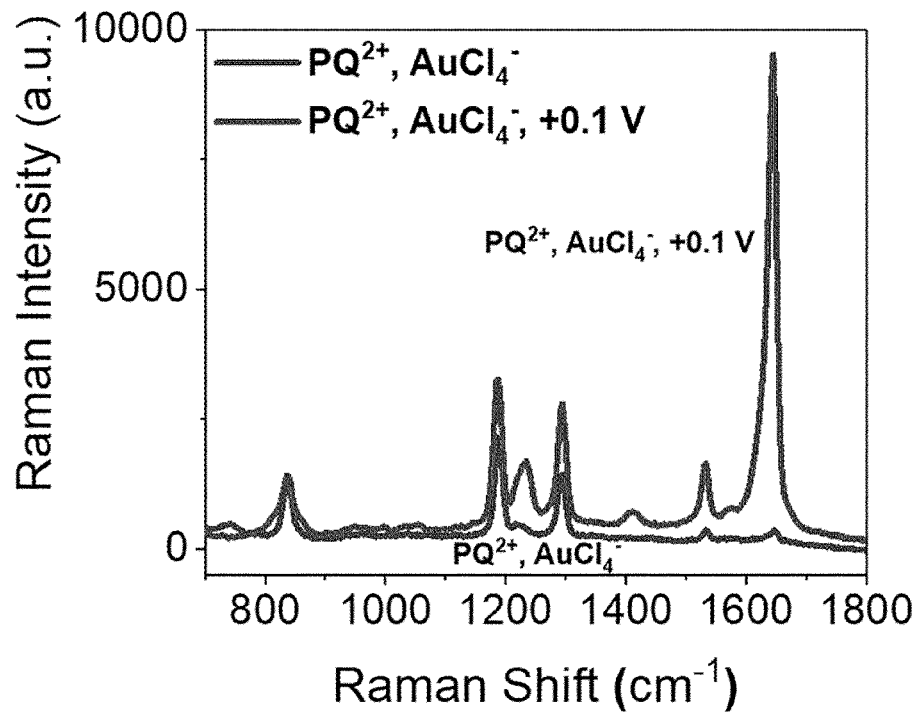
Figure 4C:
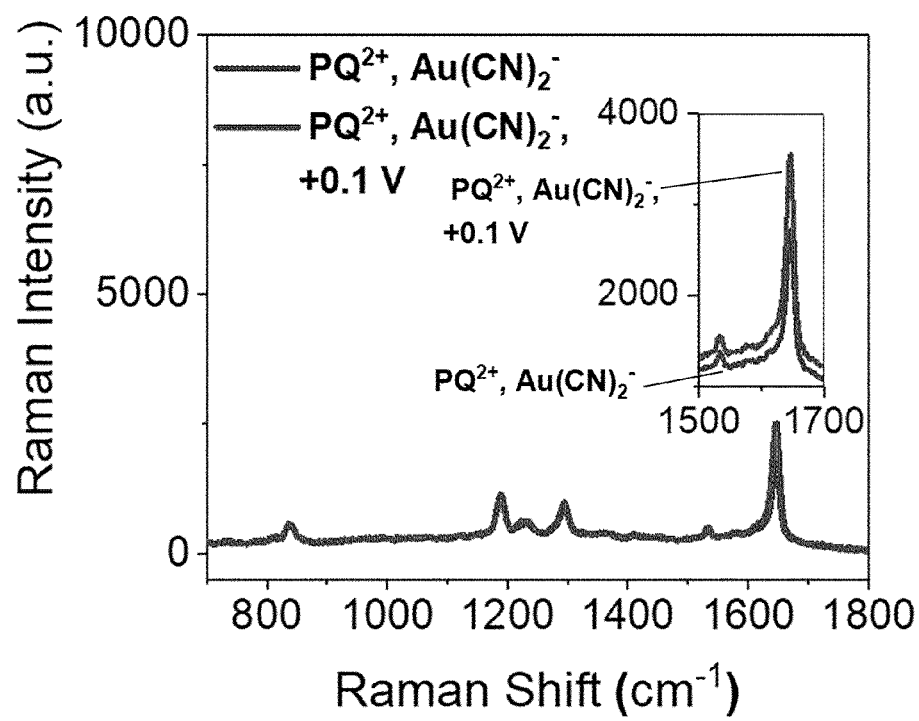
Figure 5:
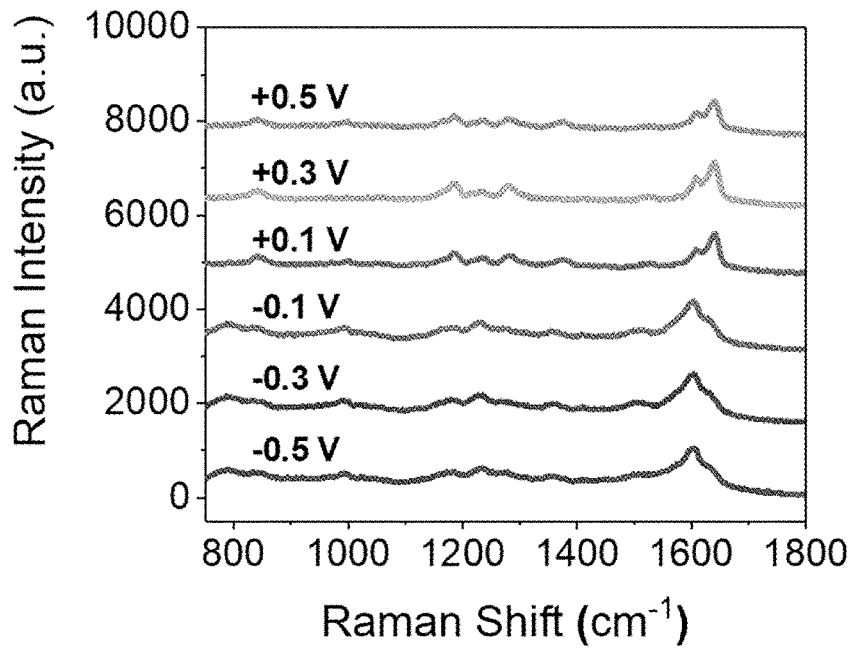
FIG. 5 is a diagram showing the SERS spectrum of $PQ^{2+}$ (5 μM) when an electric potential of −0.5 V to +0.5 V is applied.
Figure 6A:
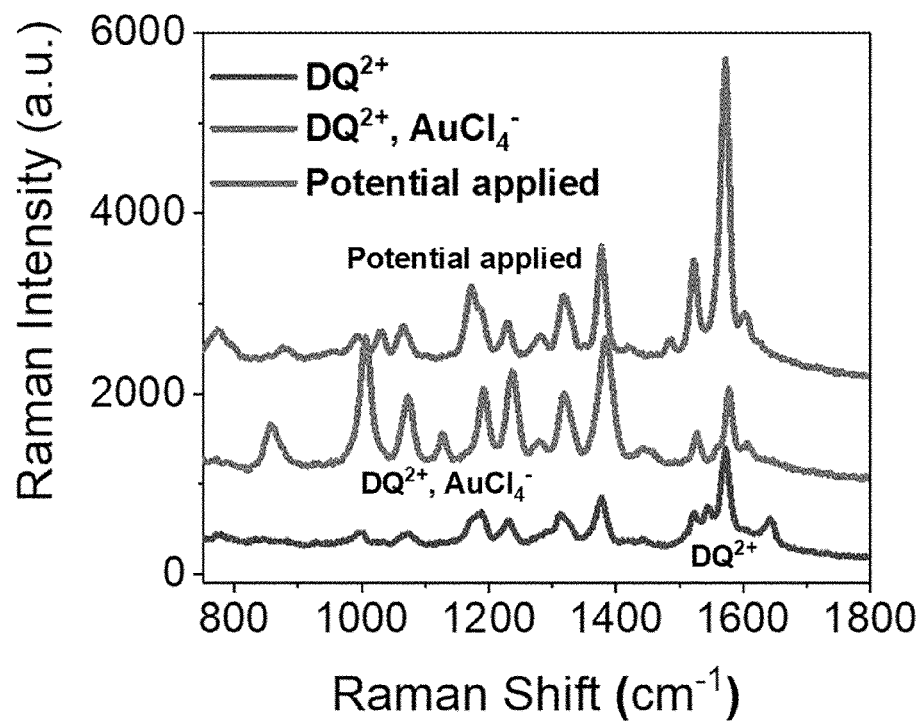
FIG. 6A is a diagram showing SERS and EC-SERS spectra of diquat (5 μM) in the presence of $AuCl_4^-$ (1 mM)
Figure 6B:
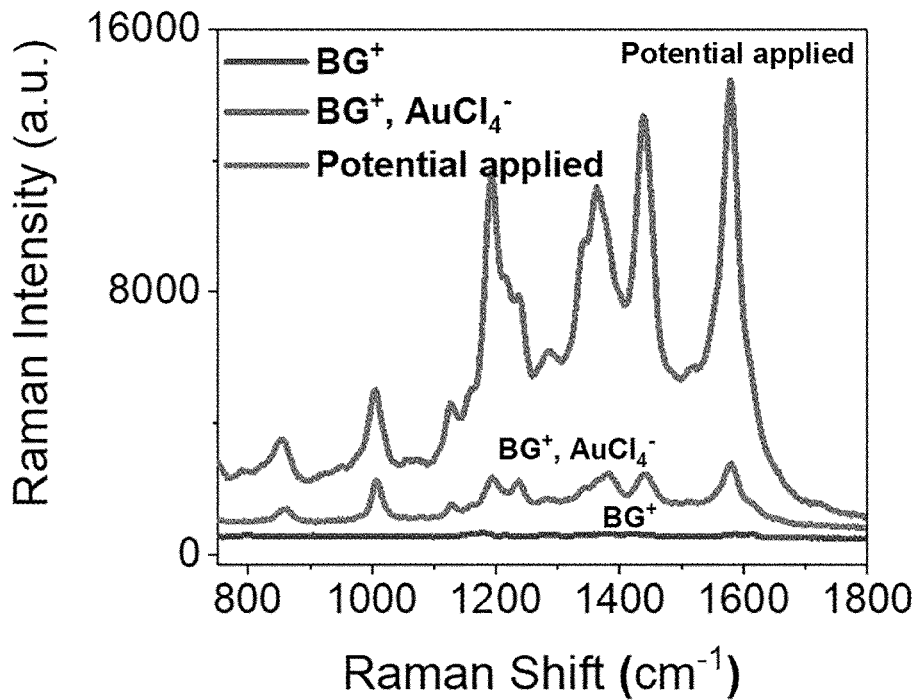
FIG. 6B is a diagram showing SERS and EC-SERS spectra of brilliant green (5 μM) in the presence of $AuCl_4^-$ (1 mM)

FIGS. 4A to 4C are diagrams showing Raman intensities corresponding to Raman shifts of $PQ^{2+}$ (5 μM) alone, $PQ^{2+}$ (when no electric potential is applied and when +0.1 V is applied) in the presence of $AuCl_4^-$ (1 mM), and $PQ^{2+}$ (when no electric potential is applied and when +0.1 V is applied) in the presence of $Au(CN)_2^-$ (1 mM). A box in the graph of FIG. 4A represents an enlarged SERS spectrum. FIG. 5 is a diagram showing the SERS spectrum of $PQ^{2+}$ (5 μM) when an electric potential of −0.5 V to +0.5 V is applied. FIG. 6A is a diagram showing SERS and EC-SERS spectra of diquat (5 μM) in the presence of $AuCl_4^-$ (1 mM), and FIG. 6B is a diagram showing SERS and EC-SERS spectra of brilliant green (5 μM) in the presence of $AuCl_4^-$ (1 mM).

Referring to FIGS. 4A to 5, FIG. 4A shows an intrinsic response of $PQ^{2+}$ to an external electric potential. The Raman spectrum recorded continuously during and after the application of the electric potential (0.1 V) did not show a significant change in the signal of $PQ^{2+}$ (other electric potentials are shown in FIG. 5). In the presence of $AuCl_4^-$, initial enhancement induced by an anion-π interaction was made by the application of an electric potential (+0.1 V) as shown in FIG. 4B. All the modes were greatly enhanced by the electric potential, but the amplification of the C=N mode (the only signal that was not enhanced by the anion-π interaction) was most remarkable with an intensity of 45 times or more. FIG. 4C shows a spectrum obtained during the application of the electric potential in the presence of $Au(CN)_2^-$. As observed, when +0.1 V was applied, only the intensity of the C=N mode increased, but the other modes were not affected. In order to investigate the contribution of electron transfer to this electric potential-derived Raman enhancement and a corresponding anion effect, the present inventors analyzed a current measured during the application of the electric potential (i.e., the measurement from the electrode to the species in the solution).

Also, the applicability of the approach was evaluated for other aromatic molecules. As shown in FIG. 6, when an external electric potential was applied in the presence of $AuCl_4^-$, the Raman signals of diquat and brilliant green were amplified by 2 times and 12 times, respectively. This shows that the proposed approach for Raman enhancement through CE is not limited to $PQ^{2+}$.

Figure 7A:
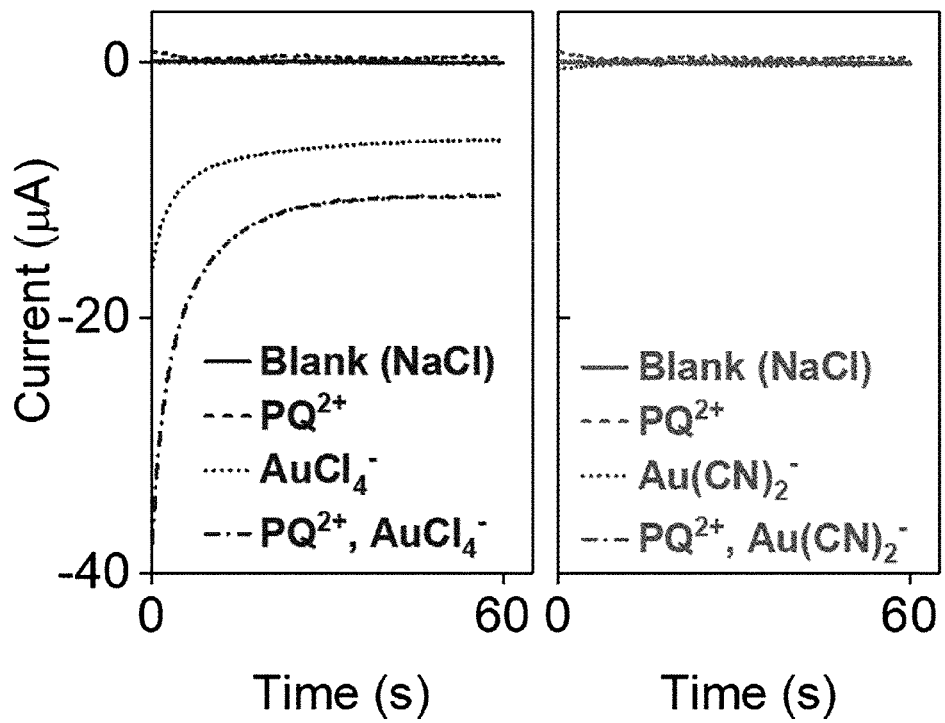
FIG. 7A is a diagram showing currents measured at +0.1 V in the presence of $AuCl_4^-$ (left) and $Au(CN)_2^-$ (right)
Figure 7B:
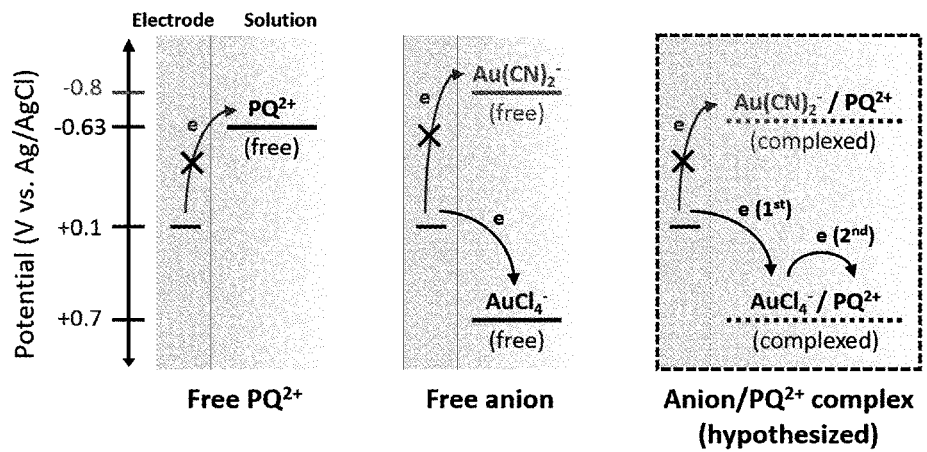
FIG. 7B is a diagram showing an energy profile representing a 2-step electron transfer mechanism at +0.1 V.
Figure 7C:
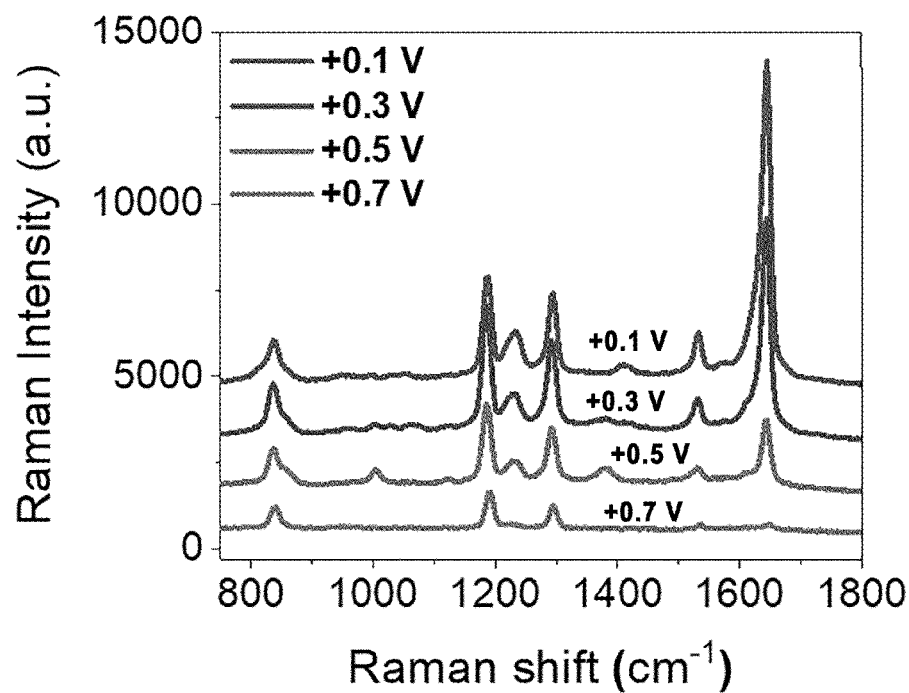
FIG. 7C is a diagram showing EC-SERS spectra of $PQ^{2+}$ in $AuCl_4^-$ at various electric potentials.
Figure 7D:
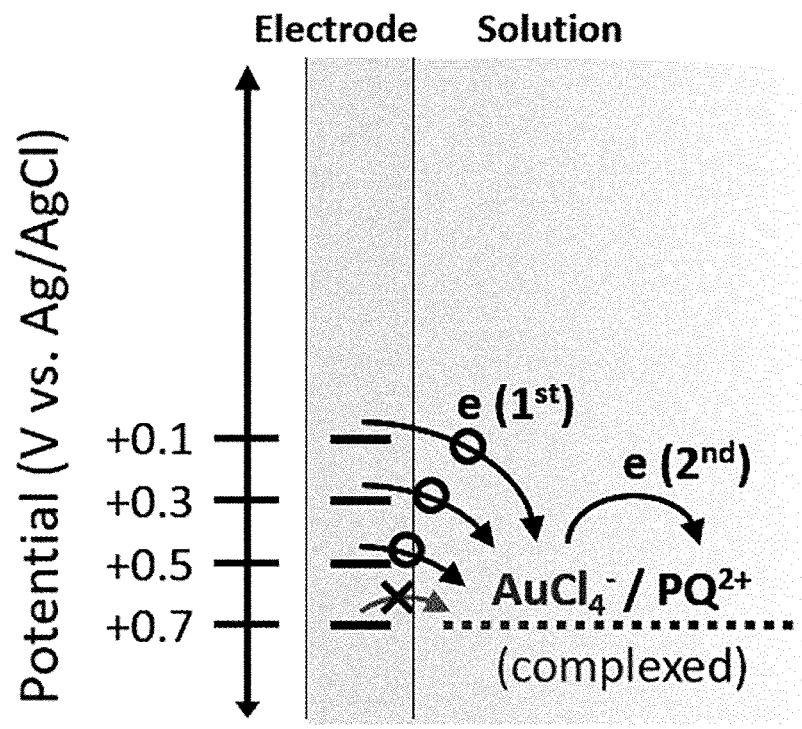
FIG. 7D is a diagram showing an energy profile representing the possibilities of electron transfer at various electric potentials, in which electron transfer does not occur at +0.7 V.

FIG. 7A is a diagram showing currents measured at +0.1 V in the presence of $AuCl_4^-$ (left) and $Au(CN)_2^-$ (right), FIG. 7B is a diagram showing an energy profile representing a 2-step electron transfer mechanism at +0.1 V, FIG. 7C is a diagram showing EC-SERS spectra of $PQ^{2+}$ in $AuCl_4^-$ at various electric potentials, and FIG. 7D is a diagram showing an energy profile representing the possibilities of electron transfer at various electric potentials, and electron transfer does not occur at +0.7 V.

Referring to FIGS. 7A to 7D, FIG. 7A shows currents at +0.1 V for a $PQ^{2+}$ solution in the absence of and in the presence of $AuCl_4^-$ or $Au(CN)_2^-$. The current measured from the $PQ^{2+}$ solution (no anions) was similar to that of a blank solution (NaCl), which means that at this electric potential, $PQ^{2+}$ neither receives nor gives electrons to the electrode. $PQ^{2+}$ has a redox potential of $E^0 \approx -0.63$ V and may receive electrons from the electrode at an electric potential of $-0.63$ V or higher. Electron transfer between the electrode and $PQ^{2+}$ at 0.1 V is not thermodynamically possible as shown in FIG. 7B (left).

Meanwhile, $AuCl_4^-$ ($E^0 \approx +0.7$ V, FIG. 8) may receive electrons from the electrode at this electric potential (FIG. 7B, middle), which is supported by a recorded cathodic current (a dotted line in FIG. 7A). A current measured from a solution containing both $PQ^{2+}$ and $AuCl_4^-$ is twice the sum of the current values measured from respective independent solutions, and this indicates that there was double electron transfer. In contrast, significant current values were not measured for an $Au(CN)_2^-$ solution ($E^0 \approx -0.8$ V) as well as the solution containing both $Au(CN)_2^-$ and $PQ^{2+}$.

The present inventors assumed that electrons moved from the electrode to $AuCl_4^-$ first and then further moved to $PQ^{2+}$ (FIG. 7B (right)). This creates an empty space for $AuCl_4^-$ to receive other electrons from the electrode, and this double electron transfer supports the flow of a current twice as high as that of $AuCl_4^-$ to $AuCl_4^-/PQ^{2+}$. As a result of the two-step electron transfer, the polarizability of $PQ^{2+}$ was changed, resulting in a Raman signal amplification phenomenon.

$Au(CN)_2^-/PQ^{2+}$ has complex compound energy between that of $PQ^{2+}$ alone and that of $Au(CN)_2^-$ alone and thus has a redox potential between that of $PQ^{2+}$ alone and that of $Au(CN)_2^-$ alone. Electron transfer from the electrode to the $Au(CN)_2^-/PQ^{2+}$ complex at +0.1 V was not thermodynamically possible, and current flow and Raman signal enhancement exhibit no significant values.

Compared to the other modes of $PQ^{2+}$, the enhancement of the C=N mode was most remarkable due to electric potentials. One factor for explaining mode-selectivity enhancement is due to contributions from the Frank-Condon theory. According to this theory, a specific Raman mode is enhanced during charge transfer reactions. The fully symmetrical oscillations of pyridine and its derivatives at about 1600 cm$^{-1}$ are most enhanced by charge transfer. Therefore, in the case of $PQ^{2+}$ as a pyridine derivative, this strong selectivity enhancement of the C=N mode may be explained using the Frank-Condon theory. Also, the mode-selectivity enhancement may be explained by the increased polarizability to be experienced by molecular bonds when one electron is excited to the anti-bonding lowest unoccupied molecular orbital (LUMO). Electrons excited to such an orbital are usually located outside the bonding region of the atoms involved, and as a result, an electron cloud can be easily deformed. It has been found that within the scope of the present invention, the LUMO of the $PQ^{2+}/AuCl_4^-$ complex is consistent with the C=N anti-bonding orbital of $PQ^{2+}$. Electron transfer to this anti-bonding orbital may attempt to polarize the electron cloud density around the bonding even further, resulting in strong mode enhancement. Also, the interatomic bonding is weakened by the presence of electrons in the anti-bonding orbital. The weakening of the bonding due to electron transfer may have a strong effect on the electron redistribution around the bonding, and this can greatly increase polarizability. Due to these factors, it was expected that the range of $PQ^{2+}$ signal enhancement due to electron transfer would have been more dominant in the C=N mode.

2-3. Contribution of Reduction of $AuCl_4^-$ to Signal Enhancement

In the EC-SERS system, $AuCl_4^-$ ions may be reduced to Au nanoparticles by an electric potential applied from the outside. The presence of electron-generating particles on the Au SERS substrate can affect EM components by increasing the "hot spot" density of the substrate. In this regard, in order to investigate the degree to which the reduction of $AuCl_4^-$ contributes to signal enhancement, changes in a surface of a SERS-active Au electrode were analyzed using a scanning electron microscope (SEM).

Figure 8A:
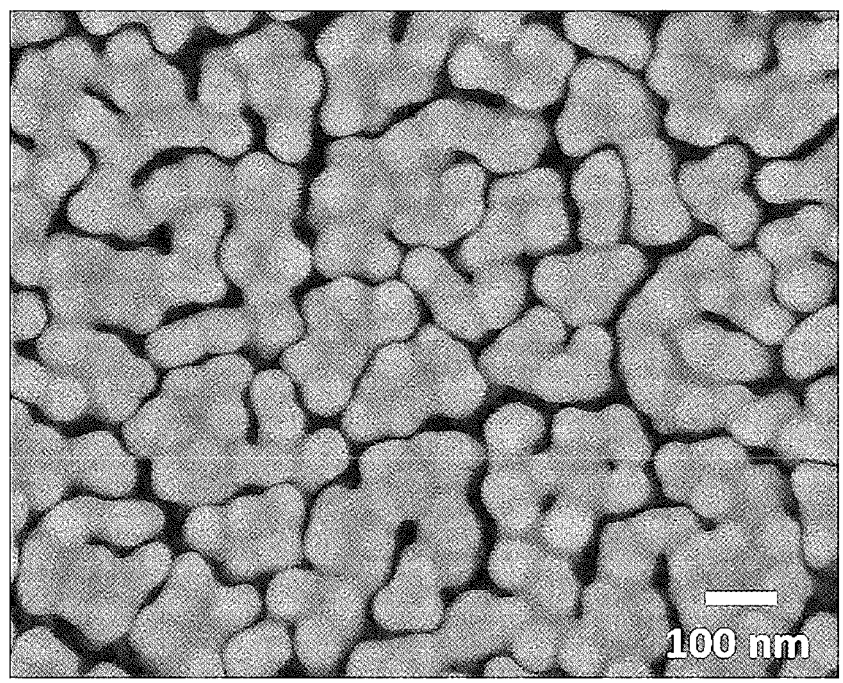
FIG. 8A to 8C show scanning electron microscope (SEM) images as-prepared Au nanopillar substrate, a substrate after applying an electric potential of +0.1 V for 4 seconds, and a substrate after applying an electric potential of +0.1 V for 60 seconds in the presence of $AuCl_4^-$ (1 mM), respectively.
Figure 8B:
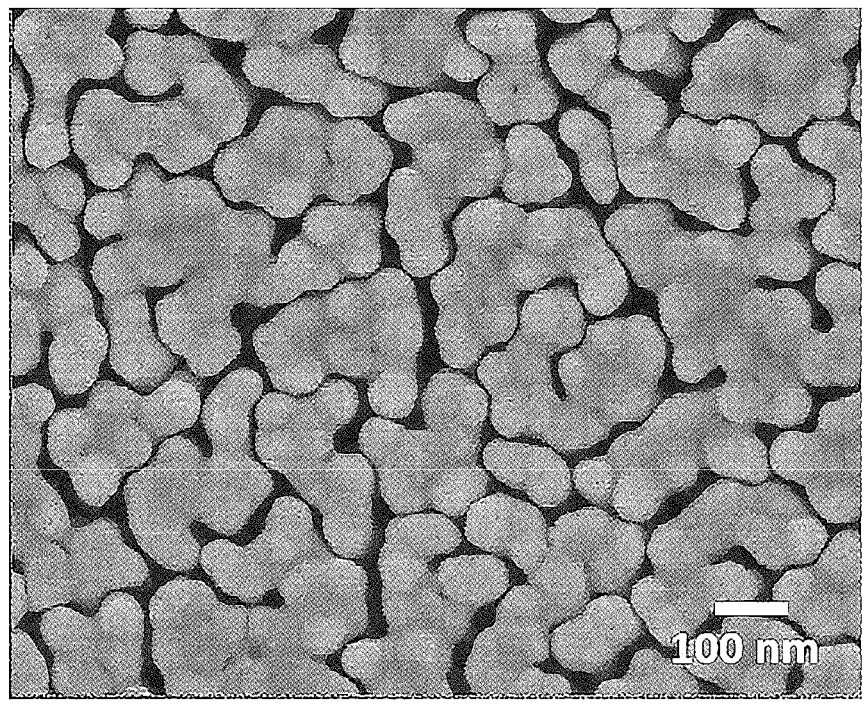
Figure 8C:
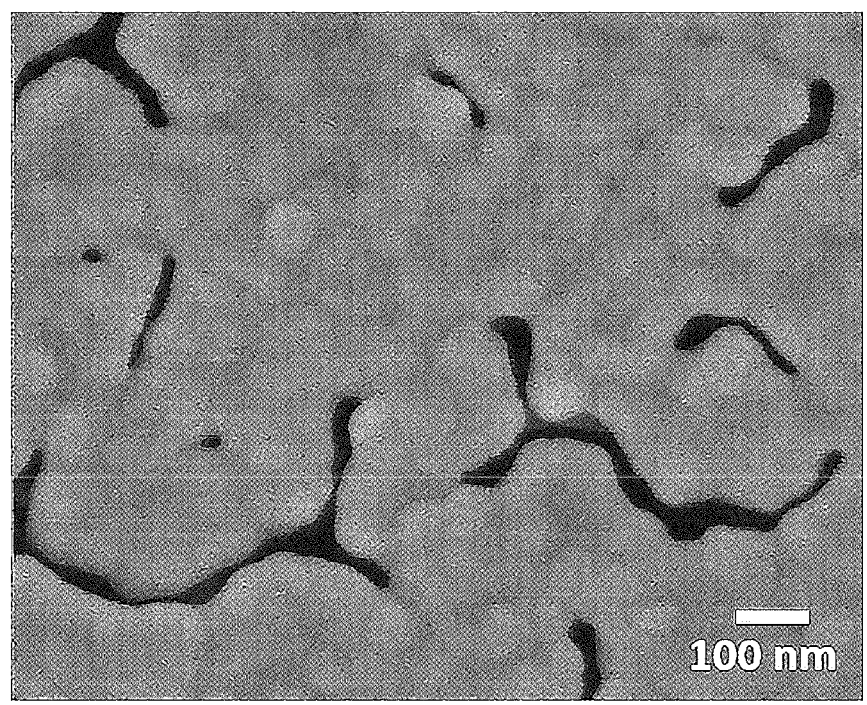

FIG. 8A to 8C show scanning electron microscope (SEM) images as-prepared Au nanopillar substrate, a substrate after applying an electric potential of +0.1 V for 4 seconds, and a substrate after applying an electric potential of +0.1 V for 60 seconds in the presence of $AuCl_4^-$ (1 mM), respectively.

Referring to FIGS. 8A to 8C, FIG. 8A shows the form of an Au substrate prepared in advance, and FIGS. 8B and 8C show the forms of the Au substrate after applying an electric potential of +0.1 V for 4 seconds and 60 seconds, respectively. Even if the deposition of nanoparticles by Au reduction could not be certainly ruled out, no noticeable change occurred in the surface shape after 4 seconds (a period of time in which the maximum enhancement was achieved). The form after the electric potential is applied for 60 seconds showed that a film layer was formed by continuous reduction of $AuCl_4^-$. When the presence of the generated nanoparticles affects the enhancement, the Raman intensity is expected to be greater after the application of the electric potential than before the application of the electric potential. Conversely, the intensity of the signal decreased after the application of the electric potential compared to before the application of the electric potential is reduced.

2-4. Study on Field of Application

Paraquat is a well-known herbicide. Paraquat is toxic to human tissues in association with long-term degenerative diseases and acute respiratory distress syndromes and is therefore restricted or completely banned in certain countries. The applicability of Raman signal enhancement by applying an electric potential in the presence of $AuCl_4^-$ makes it possible to detect a residual amount in an actual sample directly in the field. The invention of the present application was used to detect $PQ^{2+}$ in coffee beverages.

Figure 9A:
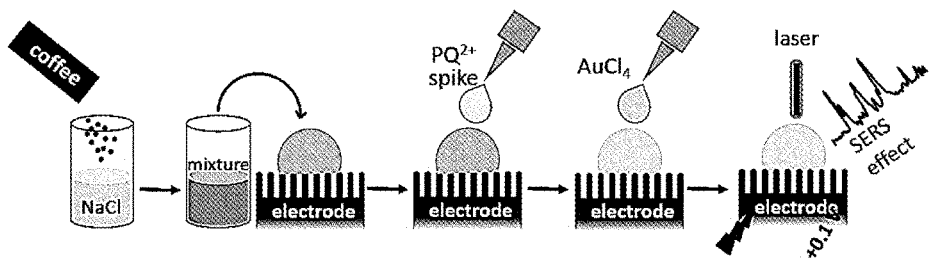
FIG. 9A is a diagram showing a process of measuring $PQ^{2+}$ in a coffee beverage and a schematic diagram showing a process of detecting $PQ^{2+}$ in a coffee beverage.
Figure 9B:
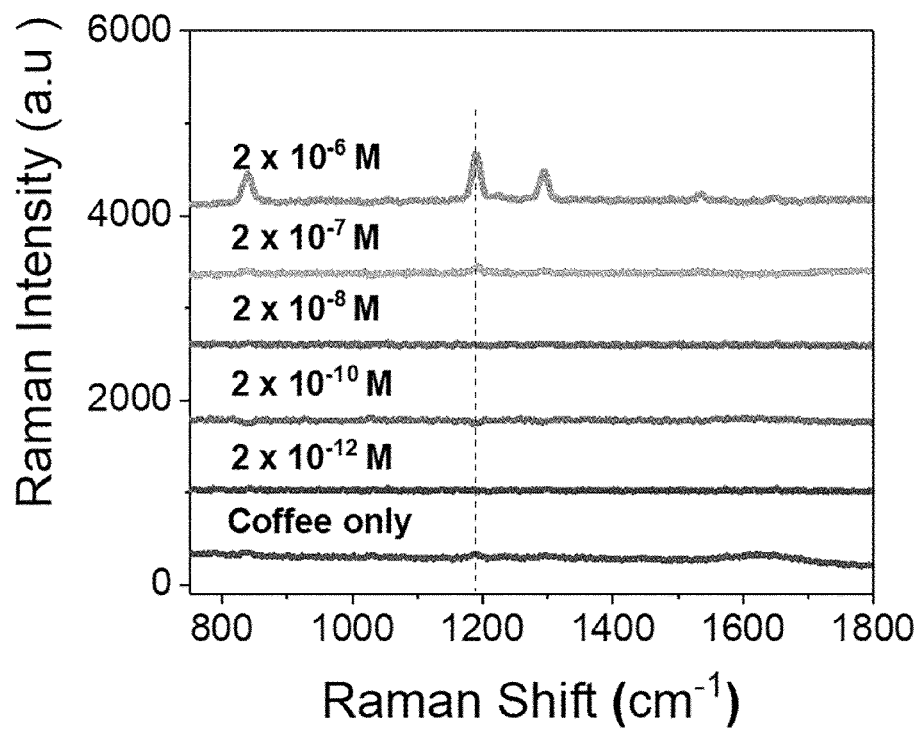
FIG. 9B is a diagram showing the SERS spectrum of $PQ^{2+}$ according to an increase in $PQ^{2+}$ concentration in the presence of $AuCl_4^-$ (1 mM)
Figure 9C:
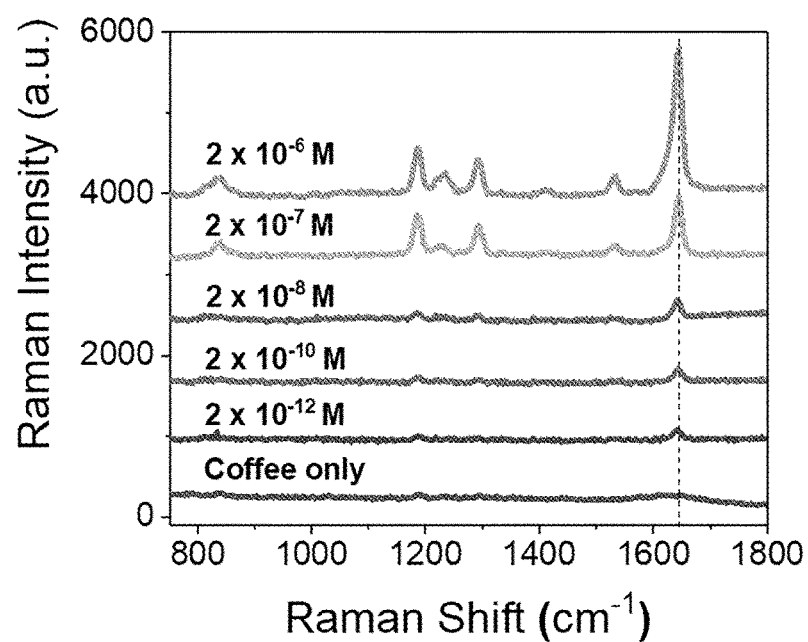
FIG. 9C is a diagram showing the EC-SERS spectrum of $PQ^{2+}$ in a coffee beverage according to an increase in $PQ^{2+}$ concentration in the presence of $AuCl_4^-$ (1 mM) while applying an electric potential of +0.1 V.

FIG. 9A is a diagram showing a process of measuring $PQ^{2+}$ in a coffee beverage and a schematic diagram showing a process of detecting $PQ^{2+}$ in a coffee beverage, FIG. 9B is a diagram showing the SERS spectrum of $PQ^{2+}$ according to an increase in $PQ^{2+}$ concentration in the presence of $AuCl_4^-$ (1 mM), and FIG. 9C is a diagram showing the EC-SERS spectrum of $PQ^{2+}$ in a coffee beverage according to an increase in $PQ^{2+}$ concentration in the presence of $AuCl_4^-$ (1 mM) while applying an electric potential of +0.1 V.

Referring to 9A to 9C, FIG. 9A is a schematic diagram showing a detection procedure without pre-processing. The coffee beverage was prepared as a recommended serving (0.9 g/120 mL) diluted with 0.1 M NaCl (1000 times dilution). In the case of applying and not applying the electric potential, the intrinsic Raman response of coffee in $AuCl_4^-$ was obtained and used as a baseline for spectrum baseline correction. When $2 \times 10^{-6}$ M $PQ^{2+}$ was mixed with a coffee beverage sample, the measured Raman spectrum did not have any noticeable peaks. When $AuCl_4^-$ (1 mM) was added, a characteristic Raman peak of $PQ^{2+}$ could be obtained (FIG. 9B). However, the limit of detection (LOD) of $2 \times 10^{-6}$ M was higher than the maximum residue limit (MRL: 0.05 mg/kg; $1.9 \times 10^{-7}$ M) of $PQ^{2+}$ in coffee according to the European Union Commission Standard. The detection sensitivity of $PQ^{2+}$ in coffee beverages has improved and dropped below the MRL value by the influence of an external electric potential. As shown in FIG. 9C, the LOD due to the electric potential was achieved up to $2 \times 10^{-12}$ M based on the 1647 $cm^{-1}$ peak. This result suggests that the EC-SERS technology using an anion-π interaction may be used for rapid on-site detection and analysis of toxic substances.

2-5. Conclusion

In the present application, the present inventors proposed an approach for amplifying a Raman signal through CE using an anion-π interaction. $PQ^{2+}$ was used as a target model molecule. Also, $AuCl_4^-$ was employed as a pair of interacting ions, and an experiment was carried out in the presence of $AuCl_4^-$. A mechanism by which a $PQ^{2+}$ signal is enhanced by the interaction was systematically investigated in the presence and absence of an external electric potential. Raman enhancement in the absence of an external electric potential was assumed to be due to a polarized π-electron cloud of $PQ^{2+}$ induced by $AuCl_4^-$, which is an anion of a metal complex. Due to the application of an electric potential, a signal amplification mechanism has been described as a 2-step electric potential-dependent electron transfer. The present inventors have shown an anion-π interaction can be used in the EC-SERS system to detect $PQ^{2+}$ at very low concentration levels without pretreatment of the actual sample. According to the present invention, it was found that the anion-π interaction can be used as an approach for amplifying a Raman signal through CE in the electrochemical SERS system. Also, the present invention may provide a cornerstone for studying various molecular interactions that can be used for signal enhancement in the SERS platform.

Embodiment II

1. $CF_4$ Plasma Surface Treatment on PET Substrate

Figure 12:
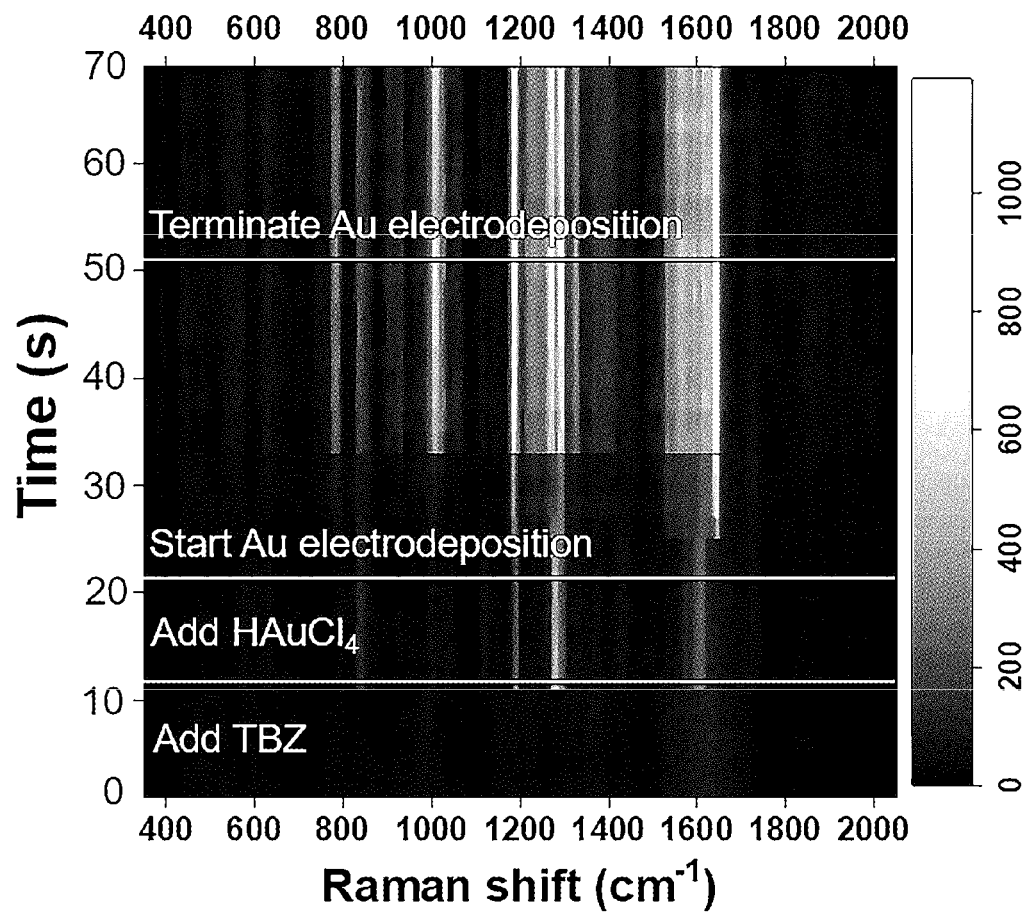
FIG. 12 is an image of SERS signal mapping according to time during an Au electrochemical deposition process in an electrolyte solution containing 10 ppb thiabendazole (TBZ) according to an embodiment of the present invention.

In order to form nanopillars on a flat PET substrate, a $CF_4$ and Ar plasma treatment process was performed under the following conditions.
  $CF_4$ plasma surface treatment process
    Working vacuum degree: 56 mTorr
    Working gas: $CF_4$ 3 sccm
    RF plasma power: 100 W
    Treatment time: 2 min
  Ar plasma surface treatment process
    Working vacuum degree: 32 mTorr
    Working gas: Ar 3 sccm
    RF plasma power: 100 W
    Treatment time: 1 min 2. Fabrication of Au Nanopillar Working Electrode Au was vacuum-deposited on a PET substrate including nanopillars formed after plasma surface treatment of $CF_4$ for 2 minutes and Ar for one minute by a sputtering deposition method under the following conditions.
  Au vacuum sputtering deposition process
    Working pressure: 7 mTorr
    Au deposition rate: 2.0 Å/s
    Au deposition thickness: 200 nm
  A working electrode was positioned in a lower portion of an electrochemical cell. An analyte (TBZ) to be analyzed was added to the electrochemical cell, and $HAuCl_4$, which is an Au precursor, was added to an aqueous solution containing NaCl. Subsequently, a voltage was applied to the working electrode to perform an Au electrochemical deposition process for 30 seconds, and then the voltage applied to the electrode was removed. Raman signals generated on the electrode surface every 2 seconds can be measured in real time by adding TBZ, which is an analyte, and focusing laser beams on the surface of the working electrode until the electrochemical deposition is completed.
  Measurement conditions in this embodiment are as follows.
    Excitation laser wavelength: 785 nm
    Laser power: 450 mW
    Laser exposure time: 2 s
    Laser spot size: 150 μm
  FIG. 12 is an image of SERS signal intensity mapping according to time during an Au electrochemical deposition process in an aqueous solution containing 10 ppb TBZ according to an embodiment of the present invention. It can also be ascertained that for 10 seconds after the addition of 10 ppb TBZ to the inside of the electrochemical cell, the SERS signal of TBZ was not detected. It can also be ascertained that for 10 seconds after the addition of 3 mM $HAuCl_4$, weak signals were detected at 1295 $cm^{-1}$ and 1602 $cm^{-1}$, which are characteristic peaks of TBZ. It can also be ascertained that when +0.3 V is applied to the working electrode in order for Au electrochemical deposition to occur, TBZ characteristic peaks (1010, 1185, 1295, 1602, and 1644 $cm^{-1}$) begin to appear in several bands, and then a strong TBZ characteristic peak is observed 10 seconds after the electrochemical deposition. Subsequently, it can also be ascertained that a stable TBZ SERS signal is continuously observed and a strong SERS signal is generated even after the voltage is removed to complete the electrochemical deposition. This is believed to be because a TBZ molecule contains an S atom that can form a chemical bond with Au, the TBZ molecule is spread on a 3D Au nanostructure surface formed during Au electrochemical deposition to form an S—Au covalent bond, and an S—Au chemical bond is stably maintained even after the voltage is removed.

Figure 13:
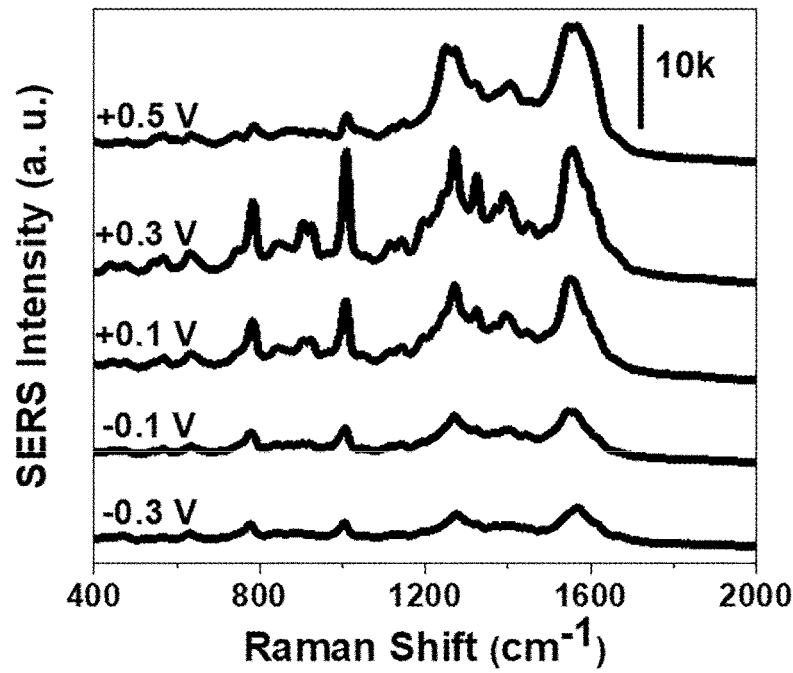
FIG. 13 is a graph comparing SERS signal intensities of a TBZ molecule measured in an electrolyte solution containing 10 ppb TBZ and 3 mM $HAuCl_4$ according to voltages applied for electrochemical deposition according to an embodiment of the present invention.

FIG. 13 is a graph comparing SERS signal intensities of a TBZ molecule measured in an aqueous solution containing 10 ppb TBZ and 3 mM $HAuCl_4$ according to voltages applied for electrochemical deposition according to an embodiment of the present invention. The minimum applied voltage that can electrochemically reduce Au is +0.75 V. That is, if a voltage higher than +0.75 V (i.e.,—voltage) is applied, $Au^{3+}$ ions in the aqueous solution may be reduced to Au metal. Therefore, a TBZ SERS signal was analyzed when a voltage of −0.3 V to +0.5 V was applied to the working electrode. As shown in FIG. 13, it can be ascertained that (in the case of a SERS signal 40 seconds after the addition of TBZ) the SERS signal of the TBZ is most strongly detected when +0.3 V is applied.

Figure 14:
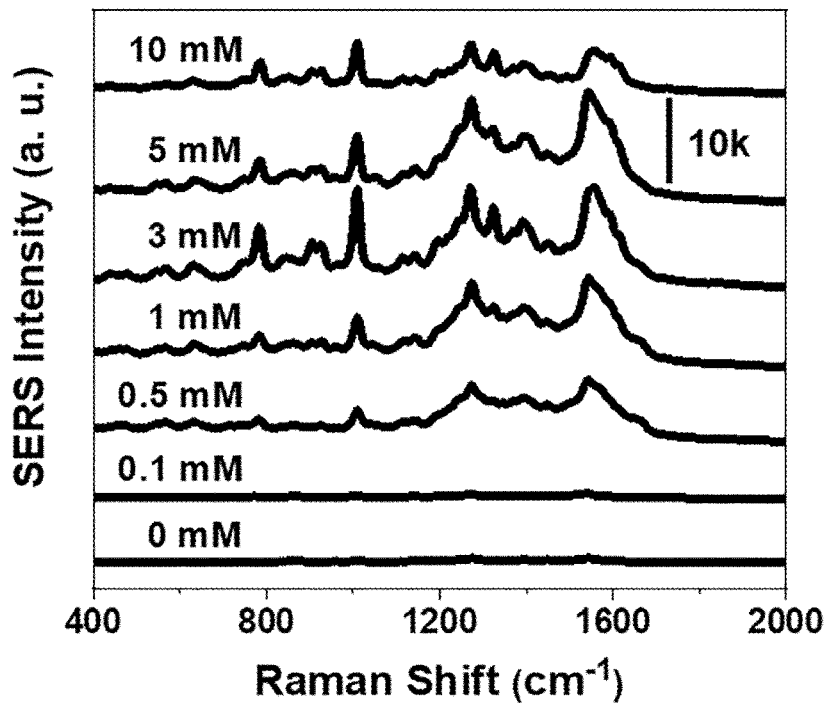
FIG. 14 is a graph comparing TBZ SERS signal intensities according to changes in $HAuCl_4$ concentration when applying a voltage of +0.3 V to an aqueous solution containing 10 ppb TBZ and different concentrations of $HAuCl_4$ according to an embodiment of the present invention.

FIG. 14 is a graph comparing TBZ SERS signal intensities according to changes in $HAuCl_4$ concentration when applying a voltage of +0.3 V to an aqueous solution containing 10 ppb TBZ and different concentrations of $HAuCl_4$ according to an embodiment of the present invention. It can be ascertained that (in the case of a SERS signal 40 seconds after the addition of TBZ) the SERS signal of the TBZ is most strongly detected when $HAuCl_4$ has a concentration of 3 mM. That is, it can be ascertained through FIGS. 13 and 14 that the optimum concentration of the Au precursor is 3 mM $HAuCl_4$ and the optimum applied voltage is +0.3 V.

Figure 15:
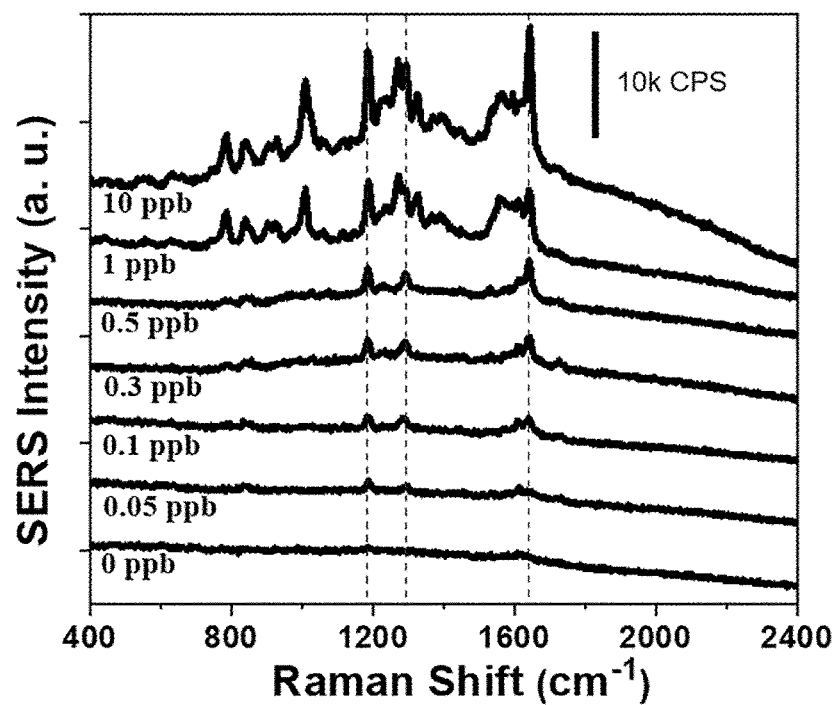
FIG. 15 is a graph comparing SERS signal intensities measured relative to the concentration of TBZ according to an embodiment of the present invention.

FIG. 15 is a graph comparing SERS signal intensities according to changes in TBZ concentration under the optimum Au electrochemical deposition conditions. It can be ascertained that the intensity of the characteristic peak of TBZ decreases as the concentration decreases, and also it can be seen that TBZ is detected even at a concentration of 0.05 ppb, which is a trace amount. A comparison spectrum was measured using a real-time Raman analysis system of FIG. 10, and SERS signals at 40 seconds after the addition of TBZ were compared.

Figure 16:
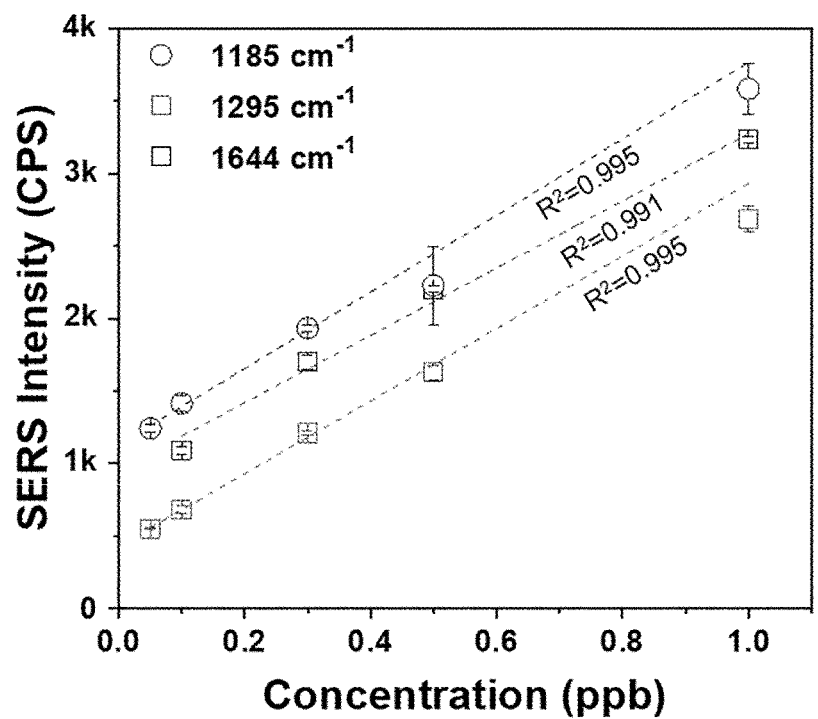
FIG. 16 is a calibration curve graph showing TBZ characteristic peak signal intensities relative to the concentration of TBZ according to an embodiment of the present invention.

FIG. 16 is a calibration curve showing SERS signal intensities relative to the concentration of TBZ according to an embodiment of the present invention. SERS signal intensities have a linear relationship depending on the concentration of a trace amount of TBZ (~1 ppb), and this suggests that quantitative analysis is possible.

Figure 17A:
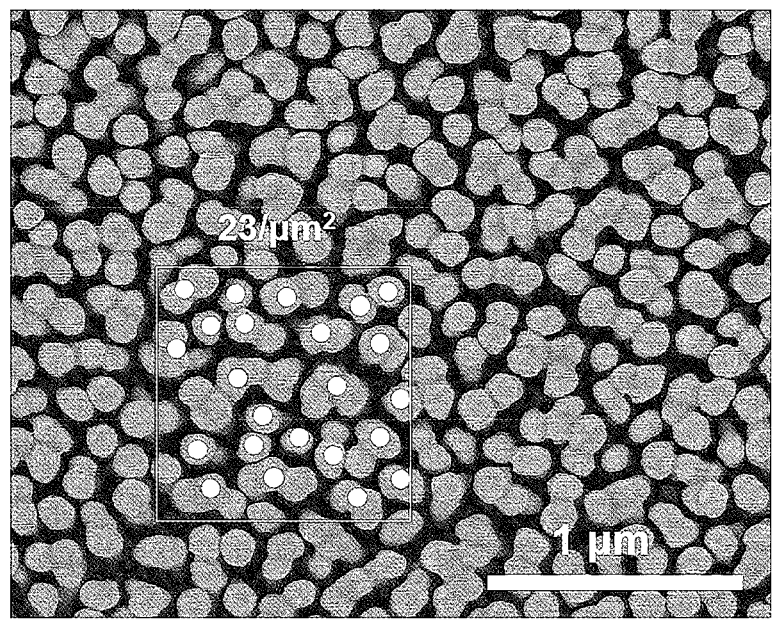
FIGS. 17A and 17B are SEM images of an Au nanopillar electrode, which is a working electrode formed after vacuum sputtering deposition of 200 nm of Au on a polymer substrate containing Au nanopillars according to an embodiment of the present invention.
Figure 17B:
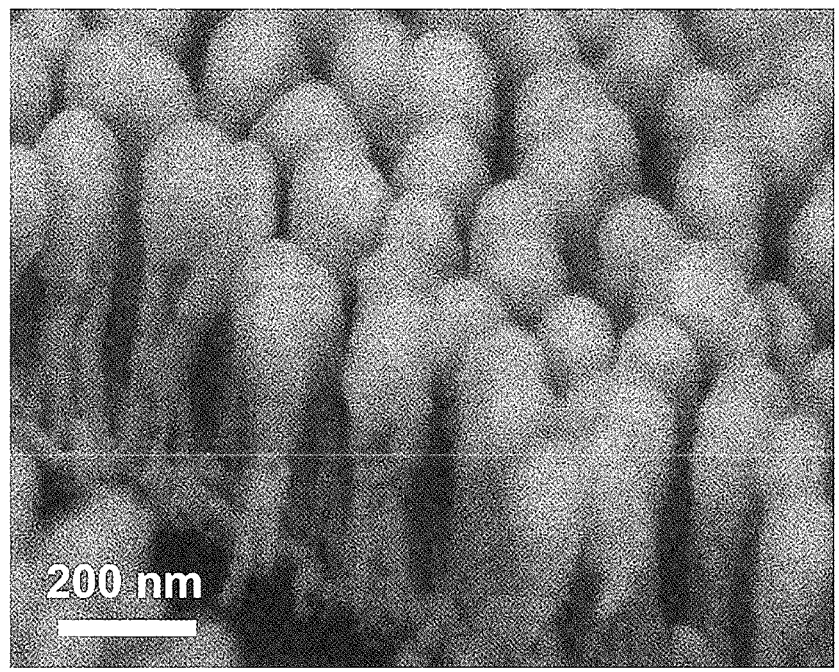

FIGS. 17A and 17B are SEM images of an Au nanopillar electrode formed after vacuum sputtering deposition of 200 nm of Au on a polymer substrate containing nanopillars according to an embodiment of the present invention. It can be ascertained that the formed Au nanopillar electrode has 23 spaced nanopillars formed in a unit area ($\mu m^2$). It can be ascertained that an Au thin-film is formed not only on the top and side surfaces of the polymer nanopillars but also on the bottom through the vacuum deposition of 200 nm of Au. That is, a continuous Au thin-film is formed so that a voltage may be applied to the entire Au nanopillar structure.

Figure 18A:
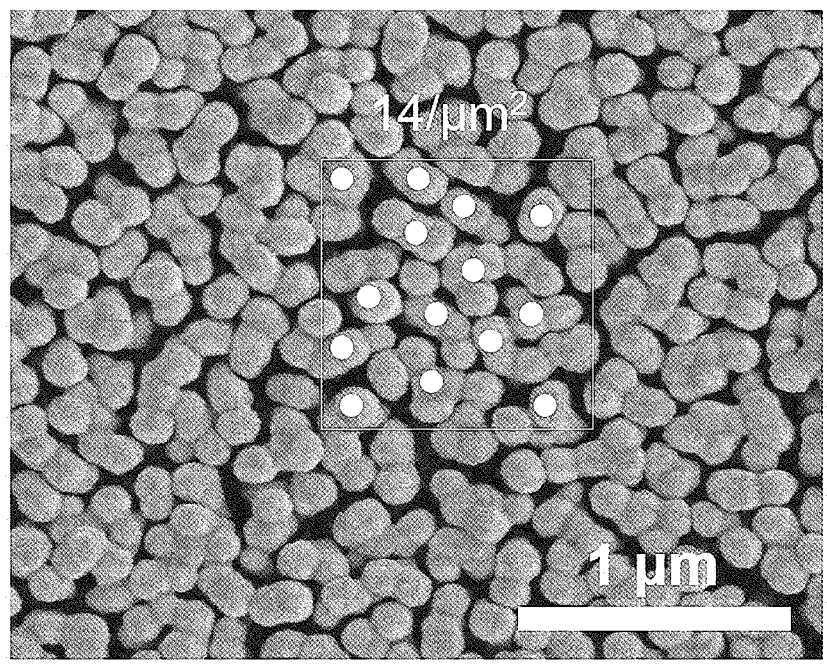
FIGS. 18A and 18B are SEM images of an Au nanopillar electrode formed after performing an electrochemical deposition process for 30 seconds by applying +0.3 V into an electrochemical cell containing 1 ppm TBZ and 3 mM $HAuCl_4$ by utilizing an Au nanopillar substrate according to an embodiment of the present invention.
Figure 18B:
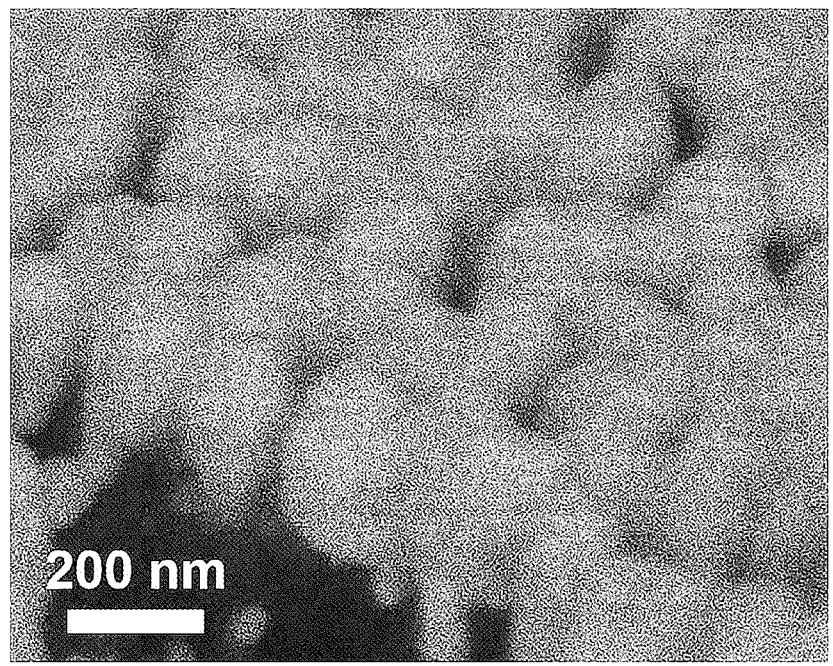

FIGS. 18A and 18B are SEM images of an Au nanopillar electrode formed after performing an electrochemical deposition process for 30 seconds by applying +0.3 V into an electrochemical cell containing 1 ppm TBZ and 3 mM $HAuCl_4$ by utilizing an Au nanopillar substrate according to an embodiment of the present invention. It can be ascertained that neighboring Au nanopillars are clustered through Au electrochemical deposition for 30 seconds and the number of Au nanopillars per unit area is decreased from 23/$\mu m^2$ to 14/$\mu m^2$.

Figure 19A:
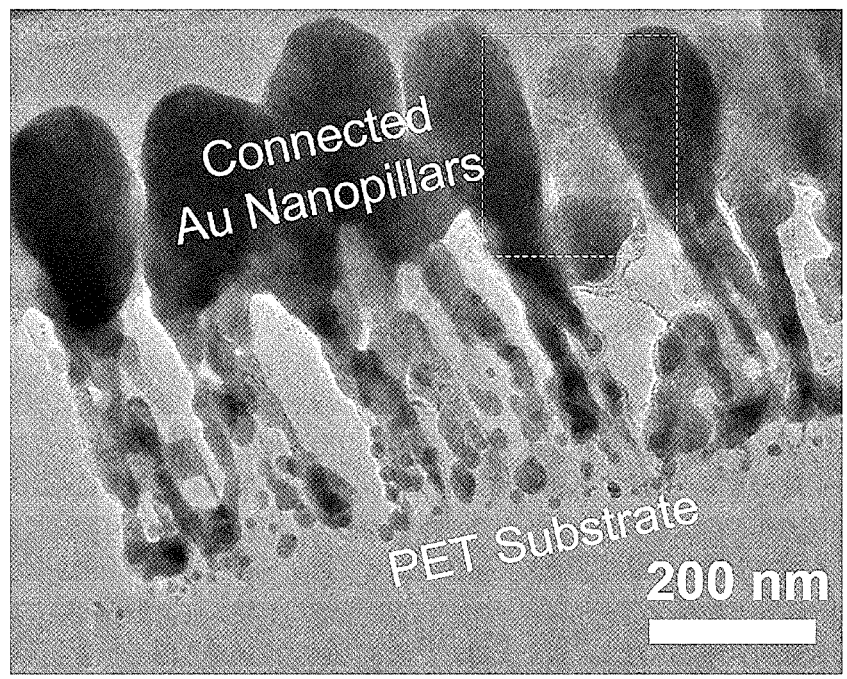
FIGS. 19A to 19D are transmission electron microscope (TEM) images of an Au substrate formed after performing an electrochemical deposition process for 30 seconds by applying +0.3 V into an electrochemical cell containing 1 ppm TBZ and 3 mM $HAuCl_4$ by utilizing an Au nanopillar substrate according to an embodiment of the present invention.
Figure 19B:
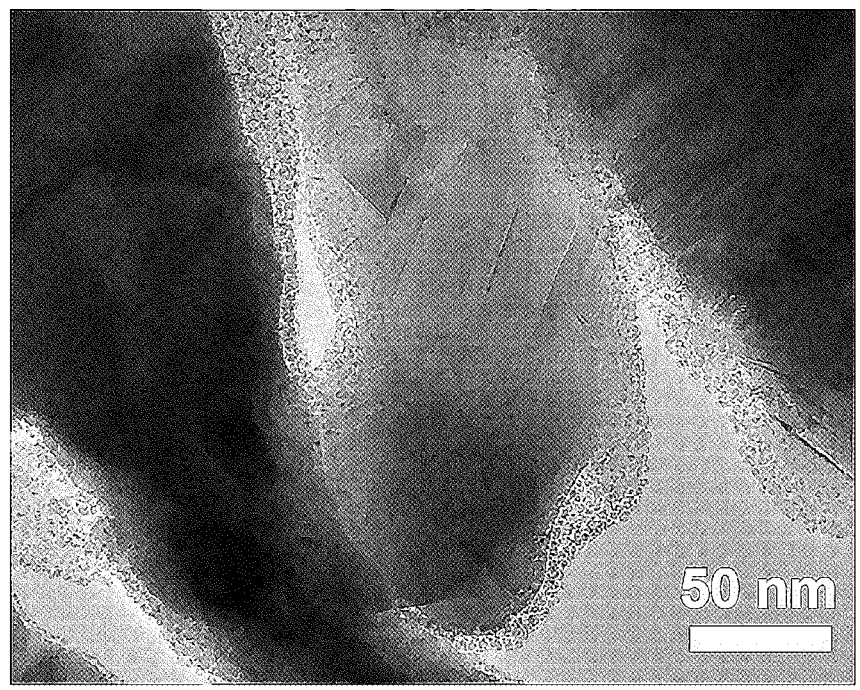
Figure 19C:
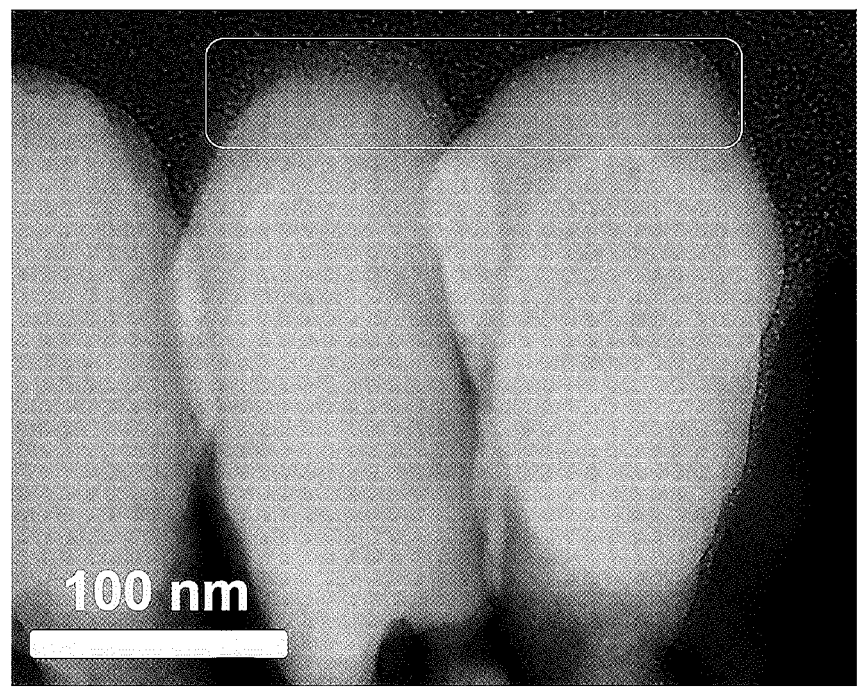
Figure 19D:
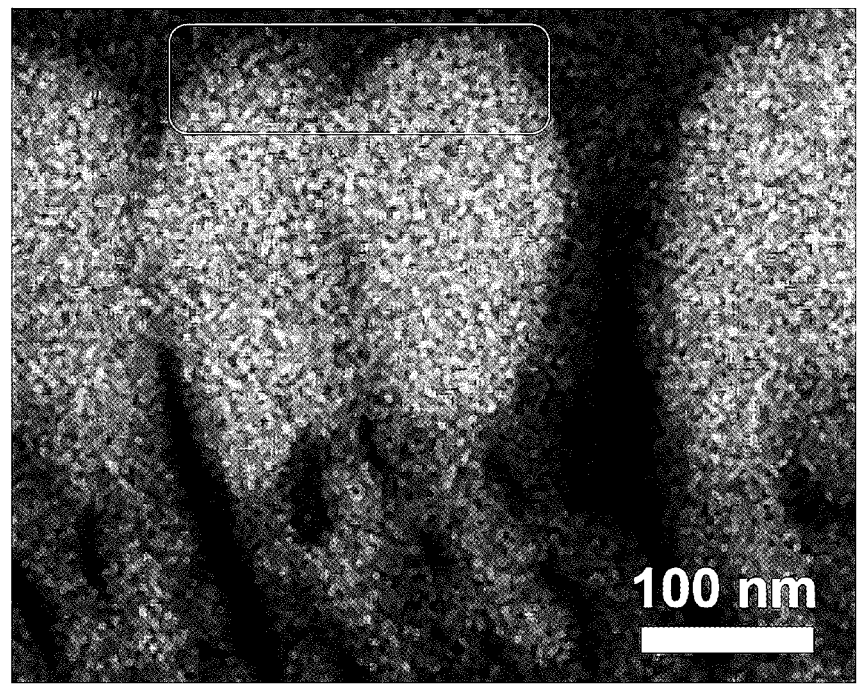

FIGS. 19A to 19D are transmission electron microscope (TEM) images of an Au substrate formed after performing an electrochemical deposition process for 30 seconds by applying +0.3 V into an electrochemical cell containing 1 ppm TBZ and 3 mM $HAuCl_4$ by utilizing an Au nanopillar substrate according to an embodiment of the present invention. Referring to FIGS. 18A and 18B, a structure in which neighboring Au nanopillars are connected to one another may be checked through the cross-sectional TEM image. However, looking closely at the Au thin-film formed by electrochemical deposition, it can be ascertained that the Au thin-film is highly porous. It can be ascertained that an Au nanopillar electrode formed through the Au vacuum sputtering process has Au atoms densely formed therein to form Au nanopillars whereas an Au thin-film formed by electrochemical deposition in an aqueous solution in the presence of TBZ molecules capable of chemical bonding with Au atoms has 3D porous structures (FIGS. 19A to 19C). A porous structure of an Au thin-film formed by electrochemical deposition and a dense Au nanopillar structure formed therein may be checked even through Au elemental analysis (FIG. 19D).

Figure 20A:
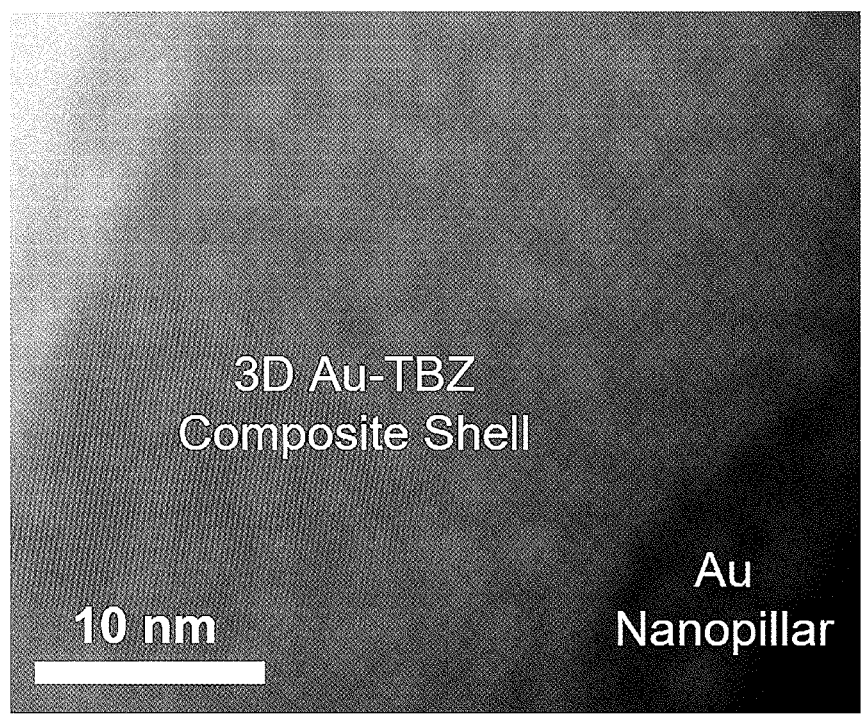
FIGS. 20A and 20B are images showing a high-resolution TEM image and an optical simulation result of an Au substrate formed after performing an electrochemical deposition process for 30 seconds by applying +0.3 V into an electrochemical cell containing 1 ppm TBZ and 3 mM $HAuCl_4$ by utilizing an Au nanopillar substrate according to an embodiment of the present invention.
Figure 20B:
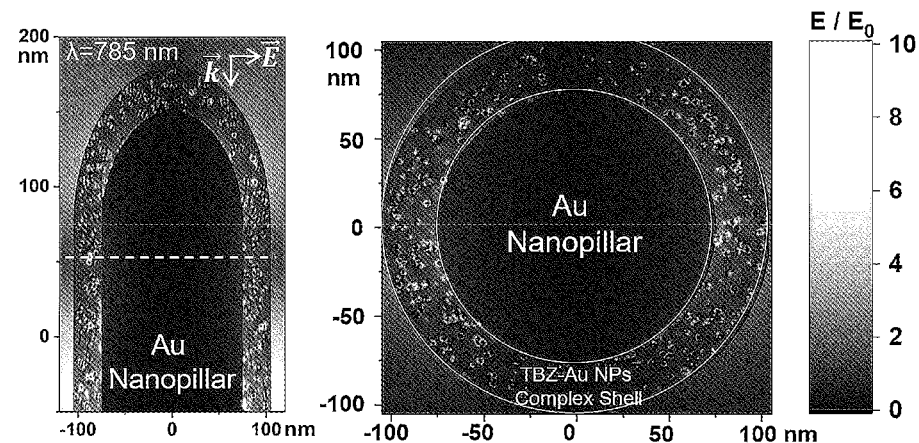

FIGS. 20A and 20B are images showing a high-resolution TEM image and an optical simulation result of an Au substrate formed after performing an electrochemical deposition process for 30 seconds by applying +0.3 V into an electrochemical cell containing 1 ppm TBZ and 3 mM $HAuCl_4$ by utilizing an Au nanopillar substrate according to an embodiment of the present invention. It can be ascertained that the electrochemically deposited Au thin-film has a porous structure in which high-density Au nanoparticles are connected to one another through the high-resolution TEM image. When performing optical simulation on the assumption that TBZ is formed in a portion where Au is not formed, it can be ascertained that a very strong electromagnetic (EM) field amplification phenomenon occurs inside a 3D porous Au-TBZ composite thin film (FIG. 20B). Since a physical mechanism of the SERS phenomenon is the amplification of the electromagnetic field through the metal nanogap, even trace amounts of hazardous substances (0.05 ppb of TBZ) may be detected within one minute.

Figure 21:
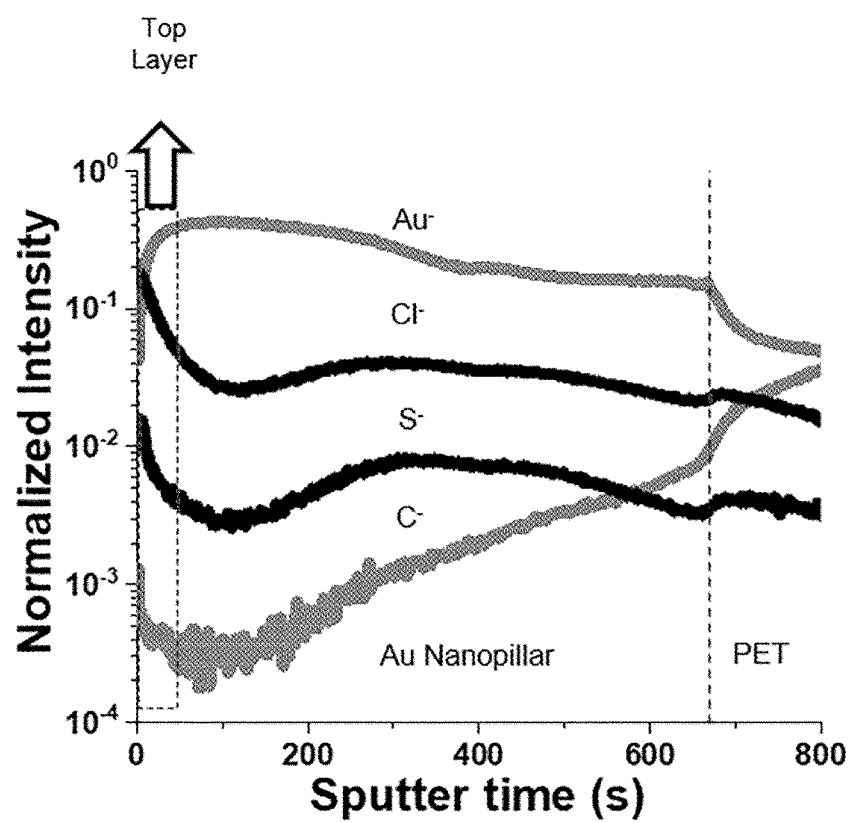
FIG. 21 is a graph of results of chemical analysis measured in depth profiling after performing an electrochemical deposition process for 30 seconds by applying +0.3 V into an electrochemical cell containing 1 ppm TBZ and 3 mM $HAuCl_4$ by utilizing an Au nanopillar substrate according to an embodiment of the present invention.

FIG. 21 is a graph of results of chemical analysis measured in depth profiling through X-ray photoelectron spectroscopy after performing an electrochemical deposition process for 30 seconds by applying +0.3 V into an electrochemical cell containing 1 ppm TBZ and 3 mM $HAuCl_4$ by utilizing an Au nanopillar substrate according to an embodiment of the present invention. It can be seen that the detected amount of $C^-$, which is a component of a PET nanopillar, increases as a sputter time increases. Also, it can be seen that the components of TBZ form a composite thin film structure along with Au through the fact that the content of $S^-$ contained inside the TBZ molecule is highest near the surface. Also, since the tendency of the content of $Cl^-$ in the NaCl component used as the electrolyte is consistent with the tendency of the content of $S^-$ in depth profiling, it can be seen that the TBZ and the $Cl^-$ component are contained inside the porous Au thin-film upon Au electrochemical deposition.

Figure 22:
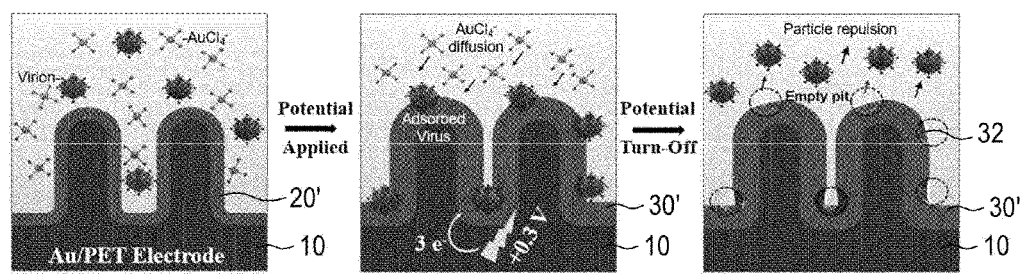
FIG. 22 is a diagram schematically showing an analysis process for rapid virus SERS detection within one minute according to an embodiment of the present invention.

FIG. 22 is a diagram showing an analysis process for rapid virus SERS detection within one minute using an electrochemical-Raman monitoring integration system according to an embodiment of the present invention. Raman analysis was performed in real time while adding H1N1 influenza virus into the electrochemical cell containing NaCl electrolyte and 3 mM $HAuCl_4$ and applying a voltage of +0.3 V to a working electrode. The surface of spike proteins (hemagglutinin and neuraminidase) with a size of about 10 nm on the surface of the H1N1 influenza virus with a diameter of about 100 nm is negatively charged. Thus, when a voltage of +0.3 V is applied to the working electrode, electrostatic attraction may cause H1N1 virus particles to be adsorbed on the electrode surface. Because the virus surface adsorption and the Au electrochemical deposition occur at the same time, it is possible to form a composite thin film made of Au-virus. When the applied voltage is removed after a certain period of electrochemical deposition, the electrostatic attraction between the adsorbed virus and the electrode is removed, and thus the virus may be desorbed from the surface and diffused into the solution. It is possible to directly measure a SERS signal of virus by measuring a Raman signal generated on an electrode surface in real time during this process of adsorption, electrochemical deposition, and desorption.

Figure 23:
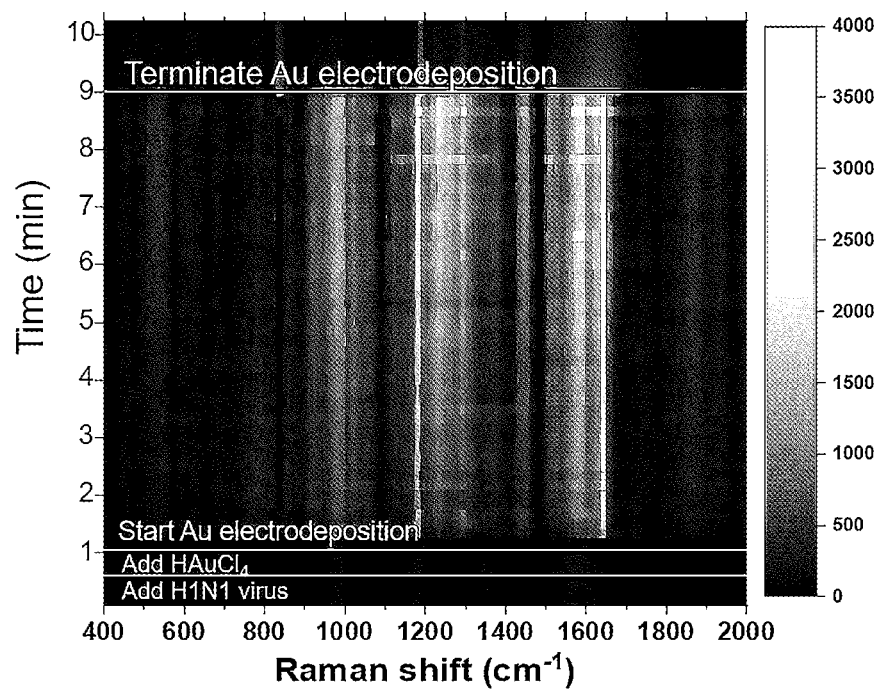
FIG. 23 is an image of SERS signal mapping according to Au electrochemical deposition time in an electrolyte solution containing 1 µg/mL H1N1 influenza virus and 3 mM $HAuCl_4$ according to an embodiment of the present invention.

FIG. 23 is an image of SERS signal mapping according to Au electrochemical deposition time in an aqueous solution containing 1 μg/mL H1N1 influenza virus and 3 mM $HAuCl_4$ according to an embodiment of the present invention. Measurement conditions in this embodiment are as follows.

Excitation laser wavelength: 785 nm
Laser power: 450 mW
Laser exposure time: 10 s
Laser spot size: 150 μm When a Raman signal is measured after H1N1 influenza virus is added to an electrochemical cell, the Raman signal of the virus is not detected at all. Subsequently, it can be ascertained that the Raman signal of the virus is not detected even when 3 mM $HAuCl_4$ is added. It can be seen that when a voltage of +0.3 V voltage is applied to a working electrode, it can be ascertained that characteristic Raman peaks (990, 1182, 1447, 1583, and 1639 $cm^{-1}$) of the virus are detected within one minute after the application of the voltage (i.e., within 2 minutes after the addition of the virus). Subsequently, a strong SERS peak is continuously observed during the application of the voltage. It was ascertained that the SERS signal of the virus is not detected within 30 seconds when the applied voltage is removed to terminate the Au electrochemical deposition. That is, it can be inferred that when the voltage is removed, the virus forming the Au-virus composite thin film is desorbed from an electrode surface (a hot spot) and thus no SERS signal of the virus is generated.

Figure 24:
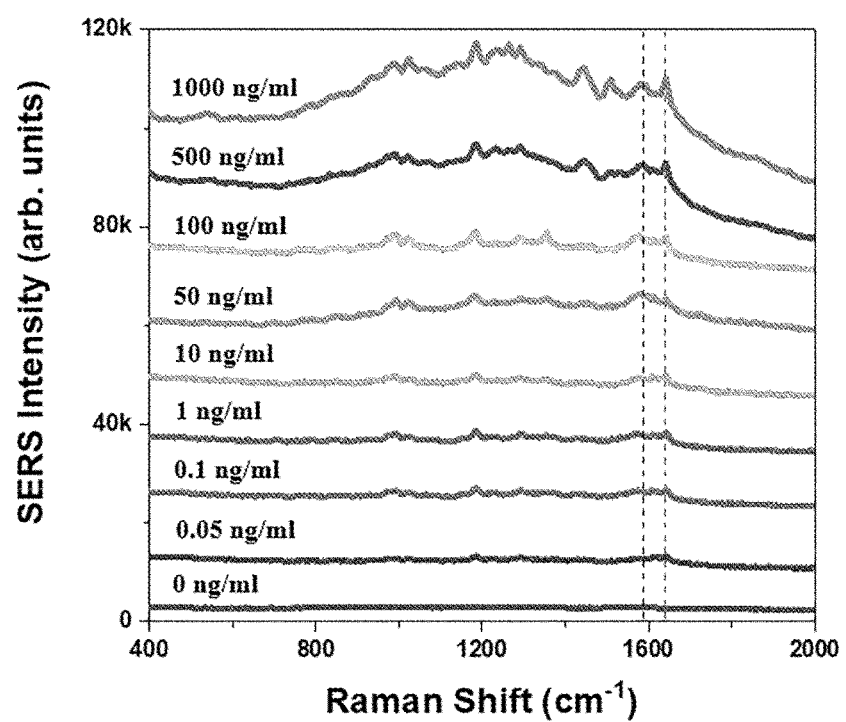
FIG. 24 is a graph comparing SERS signal intensities meas

FIG. 24 is a graph comparing SERS signal intensities measured according to the concentration of H1N1 influenza virus according to an embodiment of the present invention. It can be ascertained that an SERS characteristic peak of the H1N1 virus appears even at a concentration of a trace amount, i.e., 0.05 ng/mL. Since the surface protein of the virus has a size of around 10 nm, an Au thin film cannot be formed on the surface protein of the virus when the Au-virus composite thin film is formed, and thus the Au-surface protein composite structure with a size of around 10 nm is formed. Therefore, an SERS signal can be detected even in the presence of a trace amount of virus by a strong electromagnetic field amplification phenomenon that occurs in a nanogap structure made of a plasmonic surface protein with a size of about 10 nm.

Figure 25:
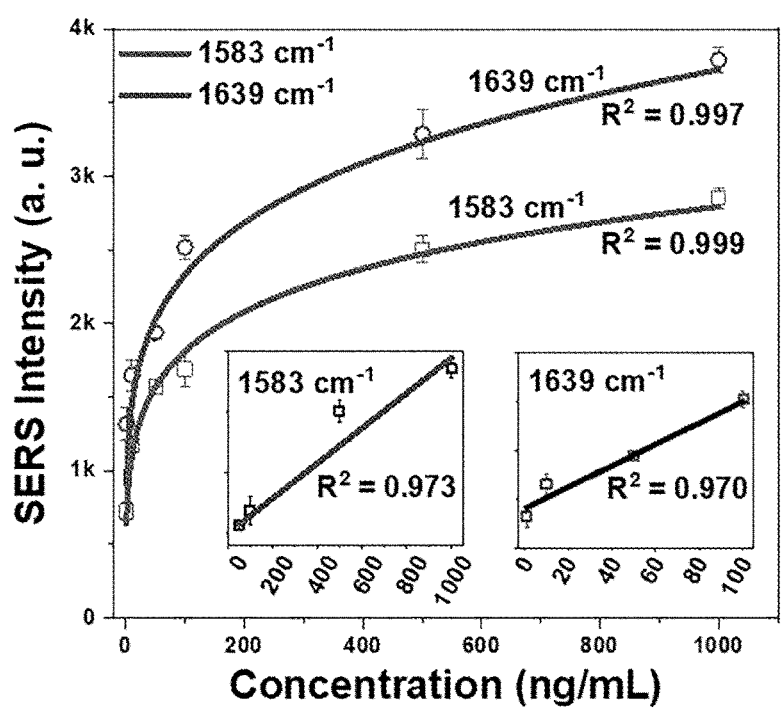

FIG. 25 is a calibration curve showing SERS characteristic peak signal intensities according to the concentration of H1N1 influenza virus according to an embodiment of the present invention. It can be ascertained that typical Langmuir isotherm model follows. It can be ascertained that the SERS signal increases in proportion to the amount of virus adsorbed on the electrode surface, and it can be inferred that even if a monolayer or more of virus is adsorbed on the electrode surface, there is no effect on the increase of the SERS signal. That is, since SERS analysis technology deals with phenomena occurring at 100 nm or less on the surface of the electrode (or the SERS substrate), there is little effect on the increase of the SERS signal even if a multi-layered virus is formed.

Figure 26:
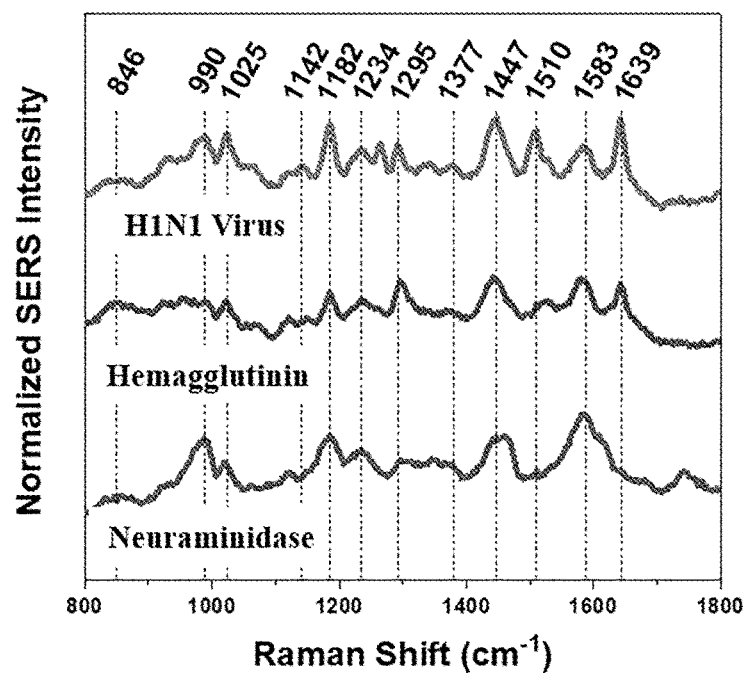

FIG. 26 is a graph comparing a SERS signal of H1N1 influenza virus (with a concentration of 1 μg/mL) and SERS signals of neuraminidase (with a concentration of 1 μg/mL) and hemagglutinin (with a concentration of 1 μg/mL), which are surface proteins of the influenza virus, according to an embodiment of the present invention. When the SERS peaks of the hemagglutinin and neuraminidase proteins are overlapped, it can be ascertained that the overlapped peaks coincide with the peak of the H1N1 virus. That is, it can be ascertained that the SERS signal of the H1N1 influenza virus is not a signal of a component inside the virus but a signal of the surface protein of the virus by a 3D hot spot formed in the Au-surface protein composite thin film.

Figure 27A:
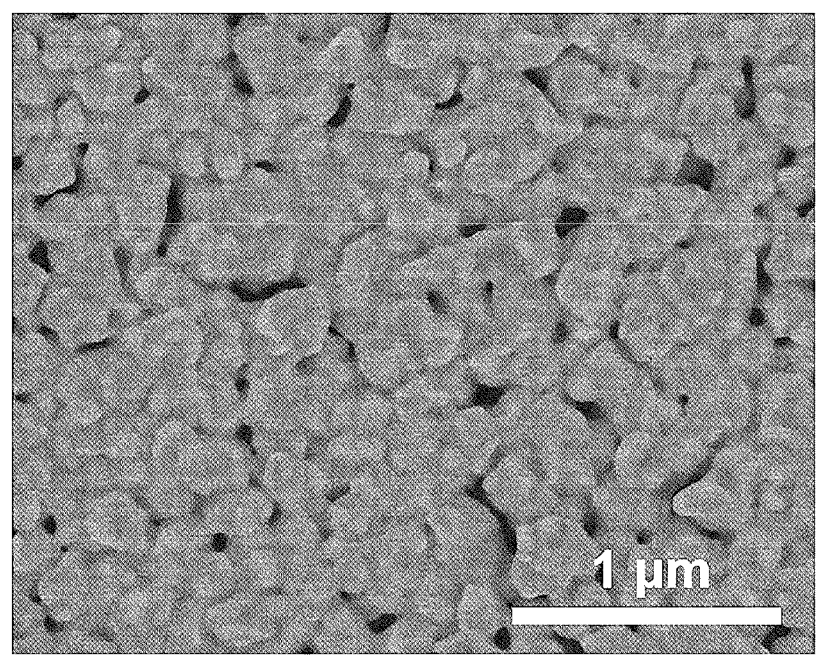
Figure 27B:
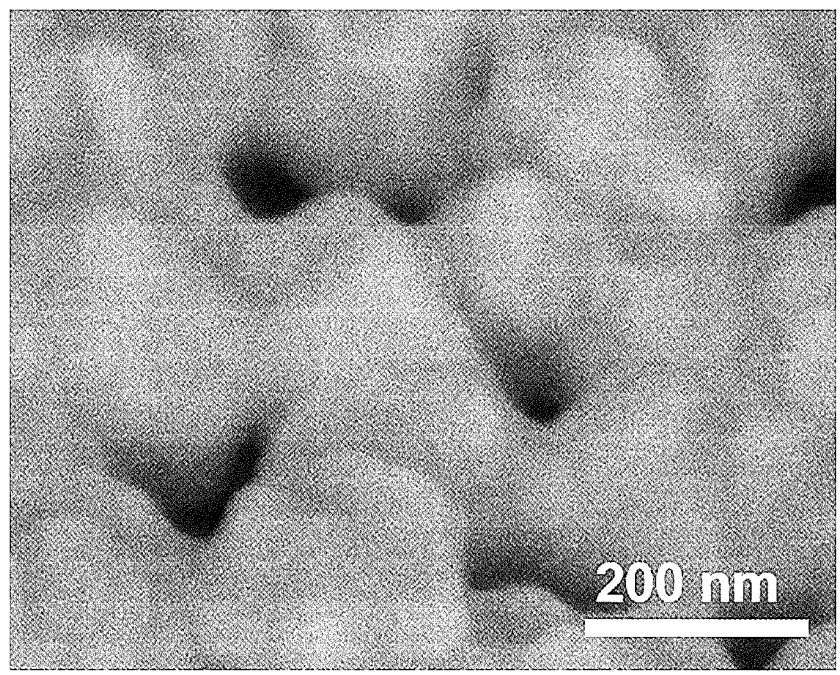

FIGS. 27A and 27B are SEM images of an Au substrate measured after performing an electrochemical deposition process for 8 minutes by applying +0.3 V to an aqueous solution containing 3 mM $HAuCl_4$. Compared to the SEM image of FIGS. 18A and 18B, it can be ascertained that spaced Au nanopillars are connected to one another through an electrochemical deposition process for a long time, i.e., 8 minutes, to form a continuous thin film.

Figure 28A:
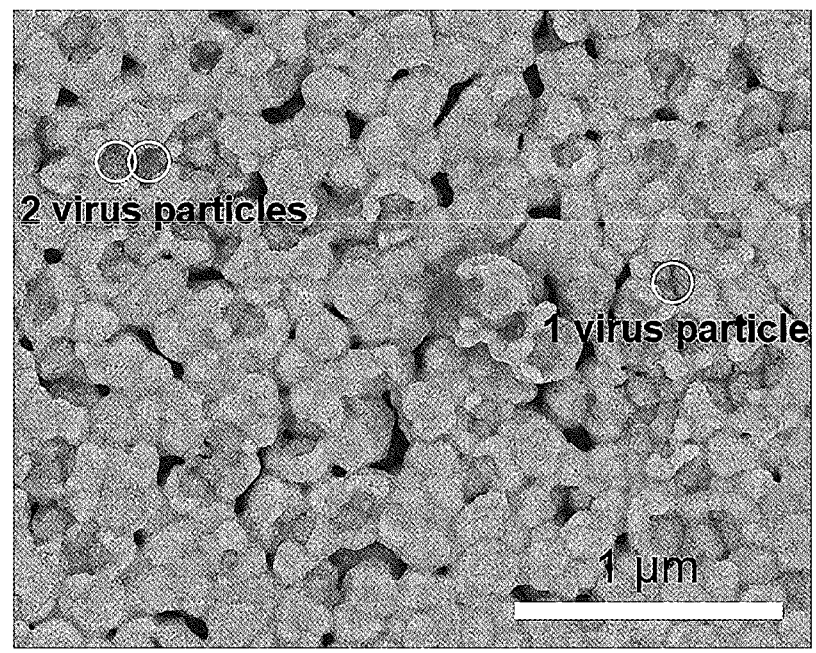
Figure 28B:
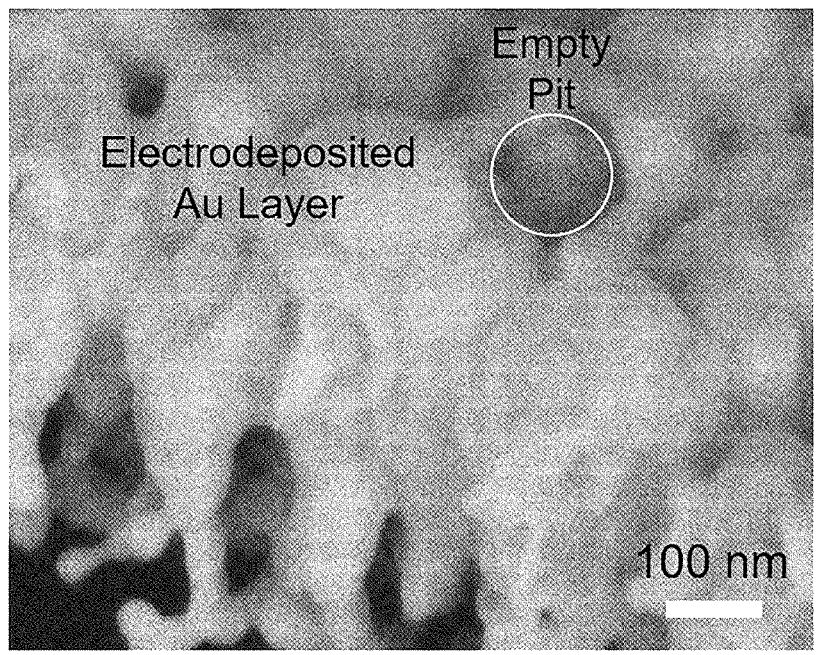

FIGS. 28A and 28B are SEM images of an Au substrate measured after performing an electrochemical deposition process for 8 minutes by applying +0.3 V to an aqueous solution containing 3 mM $HAuCl_4$ and 1 μg/mL H1N1 influenza virus. Compared to the electrochemically deposited substrate with no virus particles (FIGS. 27A and 27B), FIG. 28A shows that a number of circular pits or holes at the level of 100 nm are observed on the electrode surface. In the cross-sectional SEM image, it is possible to clearly ascertain a mark where a virus particle is adsorbed during the electrochemical deposition process (FIG. 28B). That is, FIGS. 28A and 28B are essential scientific evidences that can directly prove the result of detection of the SERS signal of the virus during the electrochemical deposition process and the desorption of virus of FIG. 23 and the formation of an Au-virus composite thin film proposed in FIG. 22.

Figure 29:
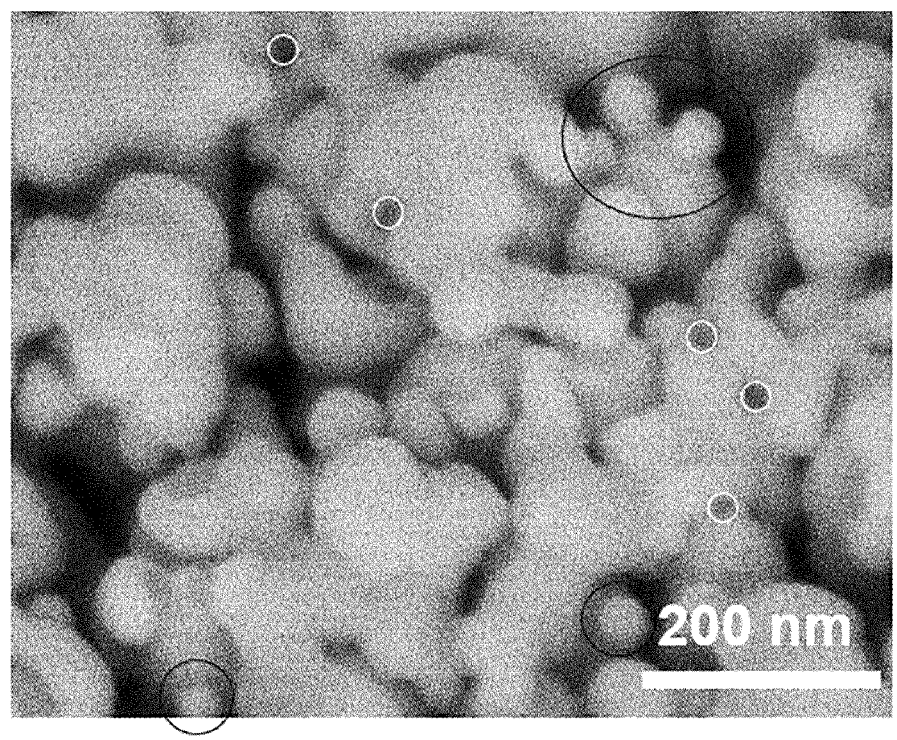

FIG. 29 is an SEM image of an Au substrate measured after performing an electrochemical deposition process for 8 minutes by applying +0.3 V to an aqueous solution containing 3 mM $HAuCl_4$ and 1 μg/mL neuraminidase protein. It can be ascertained that a number of spherical Au particles (black circular solid line) and pits (white circular solid line) are mixed. The size of the virus particle is around 100 nm, and the size of the surface protein is around 10 nm. Thus, it can be inferred that when the surface protein with a size of about 10 nm is completely covered with an Au film during the electrochemical deposition process for 8 minutes, the surface protein is not desorbed but remains as it is even after the applied voltage is removed. That is, whether the protein is adsorbed or desorbed is determined after the voltage is removed according to the thickness of the Au thin film that is electrochemically deposited on the protein surface when a surface protein-Au composite thin film is formed.

According to an embodiment, it is possible to enhance a Raman signal using an anion-π interaction.

According to an embodiment, it is possible to remarkably enhance a Raman signal by a synergistic effect between the anion-π interaction and the application of an external potential.

According to an embodiment, it is possible to accurately detect trace amounts of samples without pretreatment of the samples by remarkably enhancing a Raman signal using an anion-π interaction.

In particular, it is possible to detect pesticide components such as paraquat ($PQ^{2+}$) or diquat ($DQ^{2+}$) remaining in food and beverage with high sensitivity.

According to an embodiment, an optical analysis substrate may be provided by forming a plasmonic nanostructure-target molecule composite thin film composed of an analyte and a 3D plasmonic nanostructure by applying a voltage to a plasmonic electrode in an electrochemical cell including an analyte and a metal precursor to induce an analyte molecule on the electrode and then performing electrochemical deposition (or electrodeposition).

According to an embodiment, an electrochemical-Raman analysis integration system may be provided that allows real-time Raman signal measurement during the process of forming the 3D plasmonic-target molecule composite thin film and that quickly analyzes a Raman signal of a target molecule simultaneously with the formation of the 3D plasmonic-target molecule thin film.

According to an embodiment, it is possible to efficiently fabricate a substrate including a 3D nanoplasmonic composite structure capable of rapid analysis.

According to an embodiment, there is provided a real-time Raman spectroscopy analysis using a substrate including the 3D plasmonic-target molecule composite structure.

Although the present disclosure has been described in detail through specific embodiments, this is for explaining the present disclosure in detail, and the present disclosure is not limited thereto. It is apparent that modifications or improvements can be made by those skilled in the art within the technical spirit of the present disclosure. All simple modifications or changes of the present disclosure belong to the scope of the present disclosure, and the specific scope of the present disclosure will be made apparent by the appended claims.

What is claimed is:

1. A substrate including a three-dimensional (3D) nanoplasmonic composite structure, the substrate comprising:
   a base substrate;
   a plurality of metal-containing nanostructures formed on the base substrate; and
   a 3D nanoplasmonic composite thin film formed on the metal-containing nanostructures by electrochemical deposition using a solution containing a metal precursor and a target molecule, and composed of a plasmonic nanostructure and the target molecule,
   wherein the target molecule is thiabendazole (TBZ), a pathogenic virus or bacteria,
   wherein the target molecule is directly attached to the metal-containing nanostructure,
   wherein the 3D nanoplasmonic composite thin film is porous, and the target molecule is present inside the plasmonic nanostructure of the 3D nanoplasmonic composite thin film such that the target molecule and the plasmonic nanostructure are integrally formed.

2. The substrate of claim 1, wherein
   the plurality of metal-containing nanostructures comprises:
   at least one of a plurality of nanopillars and a plurality of nanoprotrusions spaced apart from one another and formed on the base substrate; and
   a metal-containing thin film formed on a surface of the at least one of the plurality of nanopillars and the plurality of nanoprotrusions, and
   the metal-containing thin film is made of Au or an alloy thereof.

3. The substrate of claim 1, wherein the plasmonic nanostructure is a metal-containing nanoparticle.

4. The substrate of claim 1, wherein the 3D nanoplasmonic composite thin film has a thickness of 1 nm to 100 nm.

5. An electrochemical deposition-Raman analysis integration system comprising:
   a base substrate having a metal-containing nanostructure formed thereon as set forth in claim 1;
   an electrochemical cell configured to accommodate an electrolyte solution and the base substrate;
   a reference electrode and a counter electrode provided in the electrochemical cell;
   a power supply source configured to apply a voltage between the counter electrode and the metal-containing nanostructure, which serves as a working electrode;
   a light source configured to emit light to the base substrate; and
   a detector configured to detect a Raman spectral signal.

6. The electrochemical deposition-Raman analysis integration system of claim 5, wherein the metal-containing nanostructure is an Au nanopillar.

7. The electrochemical deposition-Raman analysis integration system of claim 5, wherein
   a 3D nanoplasmonic composite thin film composed of a plasmonic nanostructure and a target molecule is formed on the metal-containing nanostructure formed on the base substrate when a voltage is applied, and
   the 3D nanoplasmonic composite thin film is formed on the metal-containing nanostructure formed on the base substrate by:
   electrochemical deposition of the plasmonic nanostructure; and
   chemical bonding or electrostatic attraction of the target molecule.

8. The electrochemical deposition-Raman analysis integration system of claim 7, wherein the 3D nanoplasmonic composite thin film is formed by:
   electrochemical deposition of a precursor $HAuCl_4$; and
   chemical bonding or electrostatic attraction between Au and the target molecule.

9. The electrochemical deposition-Raman analysis integration system of claim 5, wherein Raman analysis is performed simultaneously with the formation of the 3D nanoplasmonic composite thin film by electrochemical deposition.

10. A method of fabricating a substrate including a three-dimensional (3D) nanoplasmonic composite structure, the method comprising:

I-i) preparing a base substrate with a metal-containing nanostructure as set forth in claim 1 in an electrochemical cell;

I-ii) preparing an electrolyte solution including a target molecule and a precursor of a plasmonic nanostructure in the electrochemical cell; and I-iii) forming a 3D nanoplasmonic composite thin film composed of a plasmonic nanostructure and a target molecule on the metal-containing nanostructure by applying a voltage to an electrode.

11. The method of claim 10, wherein in step I-iii), electrochemical deposition is performed by applying a voltage between a counter electrode and the metal-containing nanostructure, which serves as a working electrode.

12. A real-time Raman spectroscopy analysis method comprising:

II-i) preparing a base substrate with a metal-containing nanostructure as set forth in claim 1 in an electrochemical cell of an electrochemical deposition system;

II-ii) preparing an electrolyte solution including an analyte and a precursor of a plasmonic nanostructure in the electrochemical cell;

II-iii) forming a three-dimensional (3D) nanoplasmonic composite thin film composed of a plasmonic nanostructure and a target module on the metal-containing nanostructure by applying a voltage to an electrode; and II-iv) performing Raman analysis by emitting light to the base substrate on which the 3D nanoplasmonic composite thin film is formed.

13. The real-time Raman spectroscopy analysis method of claim 12, wherein the precursor of the plasmonic nanostructure is a metal complex ion, and a Raman signal is enhanced by an anion-$\pi$ interaction between the analyte and the metal complex ion.

14. The real-time Raman spectroscopy analysis method of claim 13, wherein the analyte is a material with $\pi$ electrons.

15. The real-time Raman spectroscopy analysis method of claim 13, wherein the analyte is an aromatic compound or a material containing the same.

16. The substrate of claim 1, wherein the metal precursor is an Au-containing precursor.

* * * * *